(12) United States Patent
Robinson

(10) Patent No.: US 11,506,172 B2
(45) Date of Patent: Nov. 22, 2022

(54) COLLAPSIBLE FRICTIONLESS VERTICAL AXIS POWER GENERATING WIND/OCEAN CURRENT TURBINE

(71) Applicant: Jonathan Duane Robinson, Hanover Park, IL (US)

(72) Inventor: Jonathan Duane Robinson, Hanover Park, IL (US)

(73) Assignee: Jonathan Duane Robinson, Hanover Park, IL (US)

( * ) Notice: Subject to any disclaimer, the term of this patent is extended or adjusted under 35 U.S.C. 154(b) by 0 days.

(21) Appl. No.: 17/301,313

(22) Filed: Mar. 31, 2021

(65) Prior Publication Data
US 2022/0042489 A1     Feb. 10, 2022

Related U.S. Application Data

(60) Provisional application No. 63/063,928, filed on Aug. 10, 2020.

(51) Int. Cl.
| | |
|---|---|
| *F03D 3/06* | (2006.01) |
| *F03D 3/00* | (2006.01) |
| *F03B 17/06* | (2006.01) |

(52) U.S. Cl.
CPC ............ *F03D 3/062* (2013.01); *F03B 17/063* (2013.01); *F03D 3/005* (2013.01); *F05B 2210/11* (2013.01); *F05B 2210/12* (2013.01); *F05B 2210/16* (2013.01); *F05B 2220/30* (2013.01); *F05B 2240/211* (2013.01); *F05B 2240/313* (2013.01); *F05B 2270/1077* (2020.08)

(58) Field of Classification Search
CPC combination set(s) only.
See application file for complete search history.

(56) References Cited

U.S. PATENT DOCUMENTS

| | | | | | |
|---|---|---|---|---|---|
| 412,099 | A | * | 10/1889 | Keller | ............ F03D 3/062 416/88 |
| 2,766,539 | A | * | 10/1956 | Framberg | ............ G09F 7/22 40/479 |
| 4,134,708 | A | * | 1/1979 | Brauser | ............ F03D 3/0472 415/30 |
| 4,191,507 | A | * | 3/1980 | DeBerg | ............ F03D 3/067 416/240 |

(Continued)

FOREIGN PATENT DOCUMENTS

DE     102011012910 A1 * 3/2012 ............ F03D 3/065

*Primary Examiner* — David E Sosnowski
*Assistant Examiner* — Wayne A Lambert
(74) *Attorney, Agent, or Firm* — Joseph T. Cygan

(57) ABSTRACT

An improved turbine over the old horizontal and vertical axis turbines because of its ability to capture several times the amount of wind. The basic design and process of this new machine can also work in the ocean at capturing ocean currents. Being Omni-directional (not having to turn into the wind) gives it one efficiency over the 3 bladed turbine. Another efficiency all embodiments have is its frictionless exponent. This quality helps save on wear and tear and maintenance cost. Most if not all past turbines have a static presents, being built in one basic wind capturing position. This new turbine is more dynamic because it can hide from wind damage and then open to capture more wind than its predecessors.

2 Claims, 19 Drawing Sheets

(56) References Cited

U.S. PATENT DOCUMENTS

| | | | | |
|---|---|---|---|---|
| 4,208,168 A * | 6/1980 | Chen | ............ | F03D 3/065 416/132 B |
| 4,218,183 A * | 8/1980 | Dall-Winther | ............ | F03D 3/067 416/119 |
| 4,342,539 A * | 8/1982 | Potter | ............ | F03D 13/20 416/9 |
| 4,421,458 A * | 12/1983 | Allan | ............ | F03D 3/064 416/117 |
| 4,545,729 A * | 10/1985 | Storm | ............ | F03D 7/06 416/132 B |
| 4,619,585 A * | 10/1986 | Storm | ............ | F03D 7/06 416/132 B |
| 5,266,006 A * | 11/1993 | Tsui | ............ | F03D 3/067 416/DIG. 4 |
| 5,454,694 A * | 10/1995 | O'Dell | ............ | F03D 9/25 416/197 A |
| 6,831,374 B2 * | 12/2004 | Seki | ............ | F03D 80/70 290/55 |
| 7,396,207 B2 * | 7/2008 | DeLong | ............ | F03D 1/0608 416/87 |
| 7,591,635 B2 * | 9/2009 | Ryu | ............ | F03D 3/068 416/111 |
| 8,322,989 B2 * | 12/2012 | Ozkul | ............ | F03D 7/06 416/117 |
| 8,796,878 B1 | 8/2014 | Hill | | |
| 8,905,704 B2 | 12/2014 | Sauer | | |
| 9,011,096 B2 | 4/2015 | Su | | |
| 9,249,778 B2 * | 2/2016 | Paulin | ............ | F03D 3/005 |
| 10,030,629 B2 * | 7/2018 | Huang | ............ | F03D 3/062 |
| 2005/0230979 A1 | 10/2005 | Bywaters et al. | | |
| 2009/0016882 A1 * | 1/2009 | Robinson | ............ | F03D 3/062 416/131 |
| 2011/0042958 A1 * | 2/2011 | Vander Straeten | ............ | F03D 13/40 290/55 |
| 2012/0068465 A1 * | 3/2012 | Dawoud | ............ | F03D 13/25 290/55 |
| 2012/0328435 A1 * | 12/2012 | Crocker | ............ | F03D 3/062 416/23 |
| 2016/0237989 A1 | 8/2016 | Abdallah | | |

* cited by examiner

COLLAPSIBLE FRICTIONLESS VERTICAL AXIS POWER GENERATING WIND/OCEAN CURRENT TURBINE

CROSS-REFERENCE TO RELATED APPLICATION

This application claims the benefit of provisional patent application Ser. No. 63/063,928, filed 2020 Aug. 10 by the present inventor.

BACKGROUND—PRIOR ART

The following is a tabulation of some prior art that presently appears relevant:

| U.S. Patents | | | |
| --- | --- | --- | --- |
| Patent Number | Kind Code | Issue Date | Patentee |
| U.S. Pat. No. 8,796,878 | B1 | 2014 Aug. 5 | Hawthorne |
| U.S. Pat. No. 8,905,704 | B2 | 2014 Dec. 9 | Sauer |
| U.S. Pat. No. 9,011,096 | B2 | 2015 Apr. 21 | Su |
| US 2016/0237989 | A1 | 2016 Aug. 18 | Abdallah |
| US 2005/0230979 | A1 | 2005 Aug. 20 | Bywaterss |

The patent US 2005/0230979 to Bywaters et al 2005 is typical of today's standard wind turbine. One of the inefficiencies of today's three bladed turbines is their lesser ability to capture the wind. Please observe the wind capturing capability of the three bladed turbine by turning to FIGS. 1A and 1B. The blade sweep area of 20 (FIG. 1B) represents the square footage of space affected by the spinning of the blades. It is easily observable that the blades themselves represent a very small percentage of the entire blade sweep area. The space taken up by the blades spinning around represents the square footage of wind that is available to be captured to generate electricity. The space between each blade represents the square footage of blade sweep area 20 (FIG. 1B) not being used to generate electricity.

Capturing several times more square footage of wind than the area of a comparable three bladed turbine is the objective. Capturing multiple times the square footage of wind would allow the new turbine to run bigger generator heads or multiple generator heads using the same square footage of air space.

Assuming that there could be a new turbine giving several times the power output for an equal amount of space used, gives it three other advantages over the old technology:

1. Smaller embodiment may help off-grid farms and homesteaders become closer to total energy independence.
2. Capturing more square footage of wind/ocean current will make the new turbine able to generate electricity using ocean currents when all its parts have been adapted to work in the oceans.
3. The new turbine would use less space per acre. For example, if a new wind turbine creates five times the electricity you will only need one fifth of the new wind turbines per acreage.

I will use U.S. Pat. No. 9,011,096 to Su 2015 to show a couple of the advantages that the new turbine's vertical axis construction has over the old three blade technology. The old three bladed turbines may use some of its own power to keep the blades facing into the wind. The new vertical axis turbine is Omni-directional. It doesn't matter which direction the wind comes from. Mr. Su's invention (like mine) is capable of capturing much more square footage of wind if it were scaled up to a comparable size. The deficiency of Su's is that it is not collapsible (like mine is), which makes his more susceptible to wind damage during a windstorm or a tornado.

A broad, flat, or concave surface is needed to maximize the actual capturing of the wind. It can act as a sail, similar to the sails on sailing ships. The third piece of prior art which preceded my improvements are of patent US 2016/0237989 to Shaabab Abdallah 2016. If it were scaled up to the same size of the new embodiment turbine, it would definitely capture wind. It even has what I refer to as stoppers, (number 36 in his patent drawing) only my stoppers are adjustable. But, his idea would also be susceptible to wind damage if scaled up. The ideal vertical axis wind turbine must be able to open up broadly and catch many times more square feet of wind than the old three bladed wind turbines but also be able to close itself away from the wind, when the wind is too high.

I found one piece of prior art with the idea of how to make a wind turbine frictionless to some degree. In U.S. Pat. No. 8,796,878 to Hill 2014, the frictionless wind turbine be invented utilized what he called a plurality of magnetic levitation bearings. The idea behind his invention is a basic, but less developed version, of how I believe it would work in mine. The use of permanent magnets severely limits the scope and ability of any large scale wind turbine. The major drawback to his invention is that it is made with permanent magnets. On small wind turbines permanent magnets might be suitable. But on a large scale wind turbine with tons of hardware and support structures, the permanent magnets would have to be of a size not yet made. The magnetic levitation bearings of Hill's would have to be scaled up and made of electro-magnets. Combining the before mentioned four basic ideas of Bywater, Su, Abdallah, and Hill with some advancements to each, will help to explain the large wind embodiment of my turbine.

SUMMARY

The new embodiments are vastly improved versions of a power generating wind/ocean current capturing turbine. There are four major features that exemplify these improvement over the three bladed turbine. The new embodiments will have a much larger wind capturing footprint compared to the old technology with comparable sweep area. The new embodiment should have a significant reduction in friction between the support tower 24 (FIG. 6A) and the wind capturing apparatus (FIG. 1D) and its supports. Larger embodiments of the new turbine should be able to close itself up (retract) to protect itself from wind damage (to a reasonable degree) and it should be able to open up and deploy itself into a wind capturing device. The largest embodiment should be able to use the operating and procedural principles of the new embodiment to also work underwater to produce electricity by capturing ocean currents.

Advantages

Accordingly several advantages of one or more aspects are as follows: the frictionless feature reduces maintenance costs. By using a system of opposing electro-magnets, the physical interaction between the support tower 24 (FIG. 6A) and the deployed wind capturing apparatus (FIG. 1D) is nearly nonexistent. Having no friction between the two main parts of the machine also helps it to produce electricity at much lower wind speeds. Building all of the major parts of the underwater version of the turbine at neutral buoyancy (at an equilibrium between floating and sinking) will allow it to be more easily towed out to sea and put in place. Capturing more square footage of wind/ocean current gives all embodiments more torque and the ability to spin the wind capturing apparatus (FIG. 1D) easier and thereby be able to push more generators or more powerful generators. What happens when the wind stops blowing? If this turbine creates 4 times the power of its predecessor, it could take the other ¾ of its power to make hydrogen through the electrolysis of water and burn hydrogen instead of coal or natural gas to make electricity.

DRAWINGS—FIGURES

In the drawings, closely related figures have the same number but different alphabetic suffixes.

FIGS. 1A to 1B shows the form of a three bladed wind turbine and a separate one with a circle superimposed over the wind turbine showing its blade sweep area.

FIGS. 1C to 1D: The one on the left shows the support tower (FIG. 1C) that holds the wind capturing apparatus. The other (FIG. 1D) sits atop and spins around the support tower.

Figure 3:
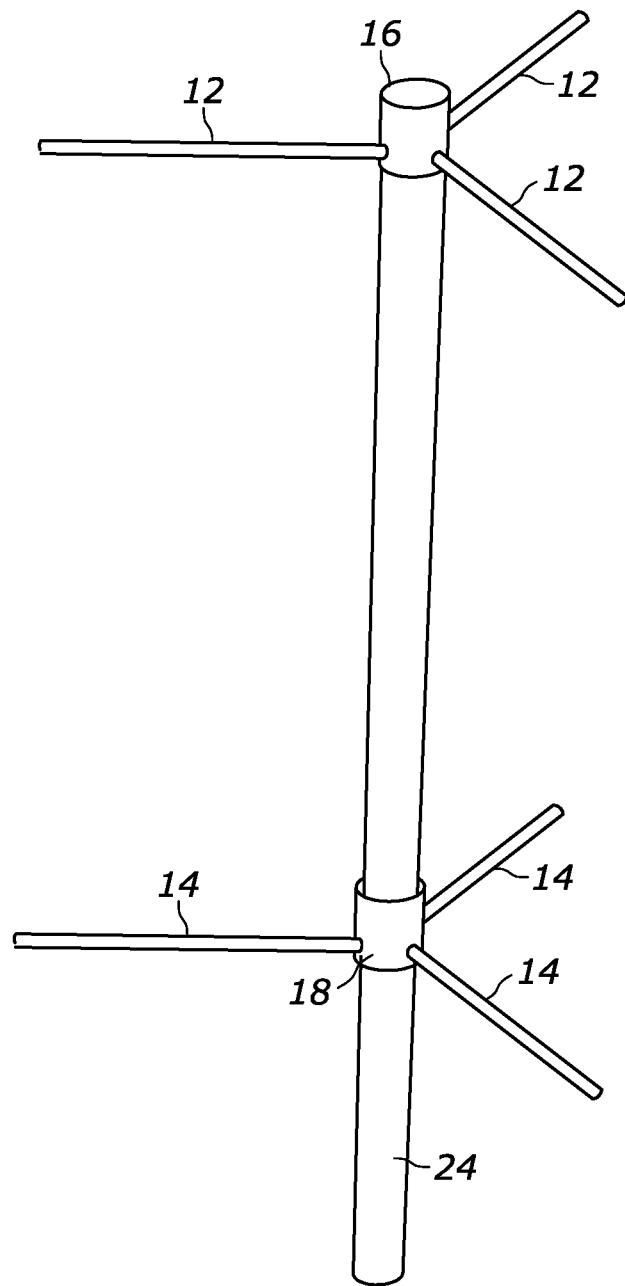

FIG. 3 shows the upper rail arms 12, the lower rail arms 14, the upper collar 16, and the lower collar 18 of the wind capturing apparatus (FIG. 3) near the beginning of deployment.

Figure 4:
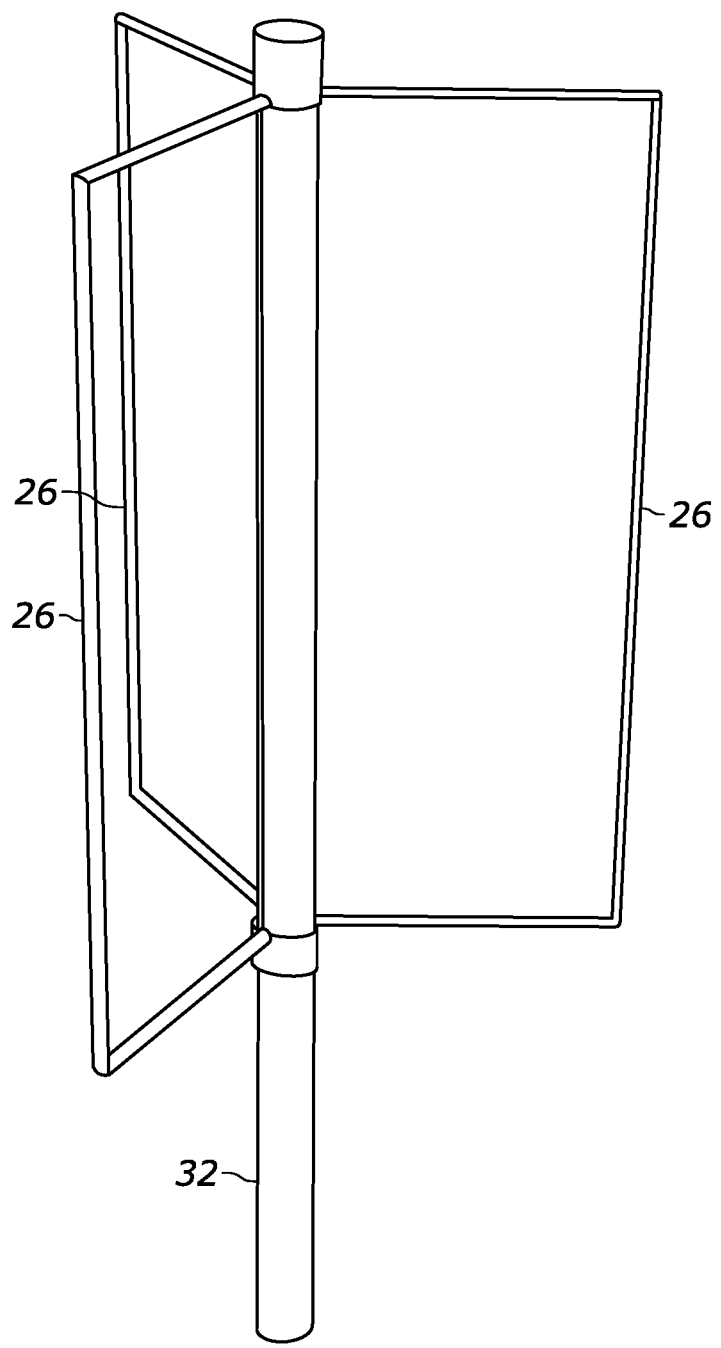

FIG. 4 the arm support rails 26 (FIG. 4) keeps the distance between the upper rail arms 12 (FIG. 3) and the lower rail arms 14 (FIG. 3) stable and constant.

Figure 5:
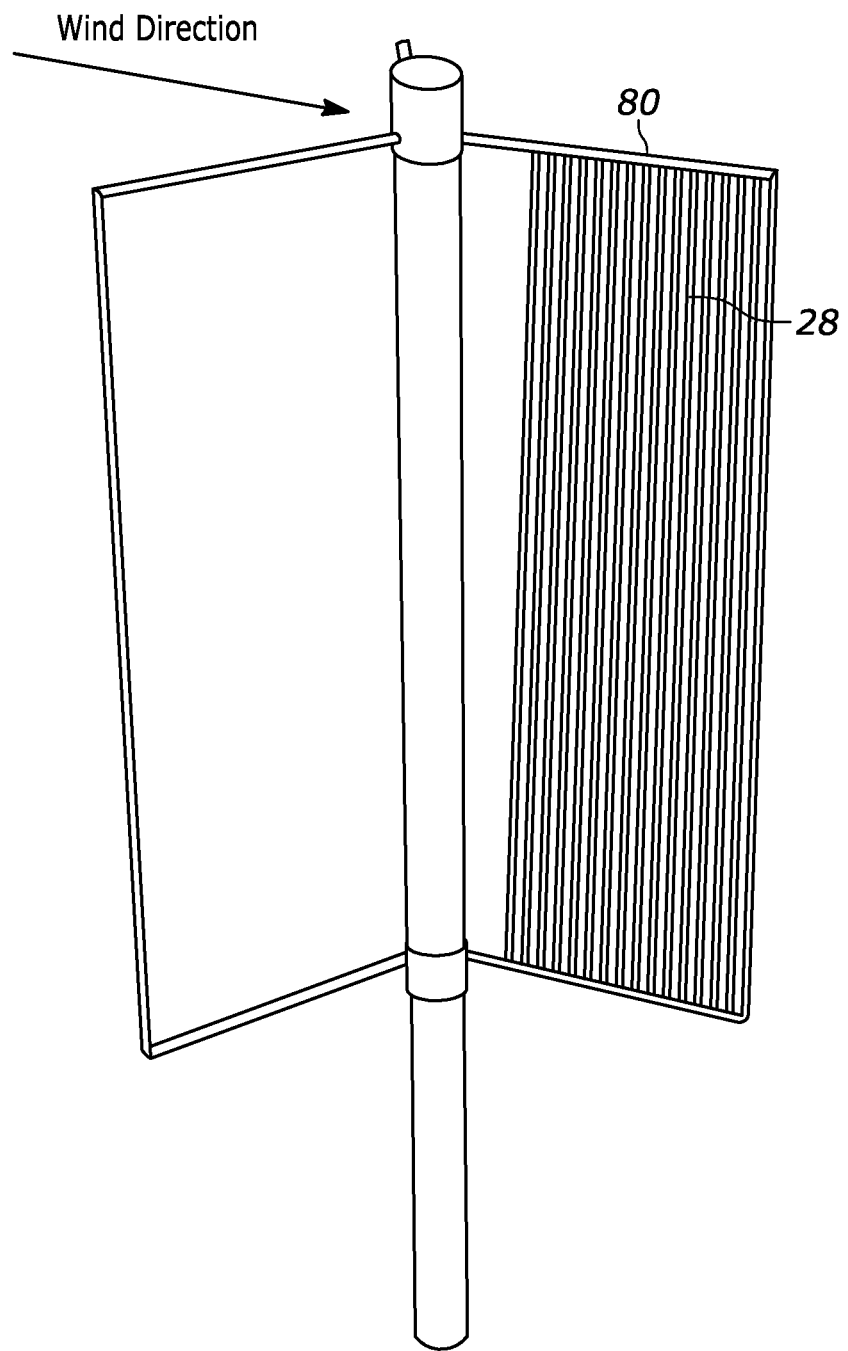

FIG. 5 represents a group of sail sections side by side, showing how they combine to make the main sail array 28 (FIG. 5).

Figure 5A:
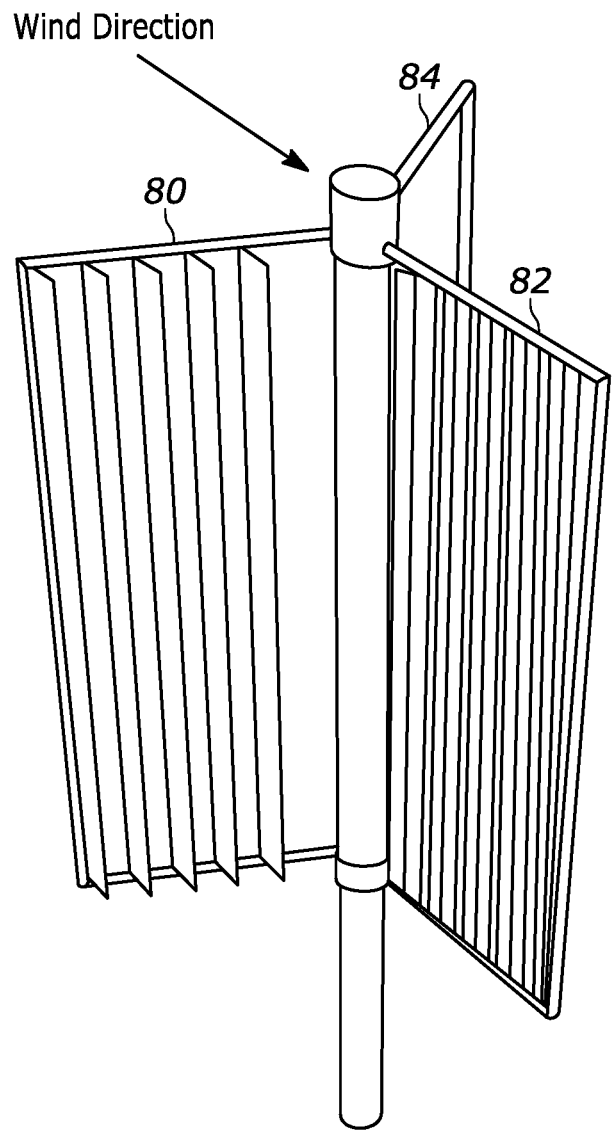

FIG. 5A represents the upper rail arms 12 (FIG. 3) with a new number that will explain the order in which the sails section 30 (FIG. 6A) are deployed. Note, there are not two numbers representing the rail arms 12 & 14 (FIG. 3). The other numbers 80, 82, and 84 represent the order in which they deploy.

Figure 1A:
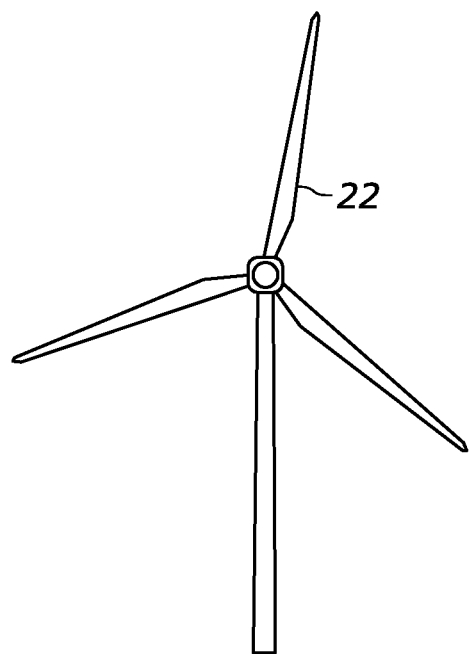
FIG. 1E to FIG. 1F shows and compares the potential wind capturing square footage of the 3 bladed turbine compared to the sail array 28 (FIG. 5) of one embodiment of the wind/ocean current turbine.
Figure 1B:
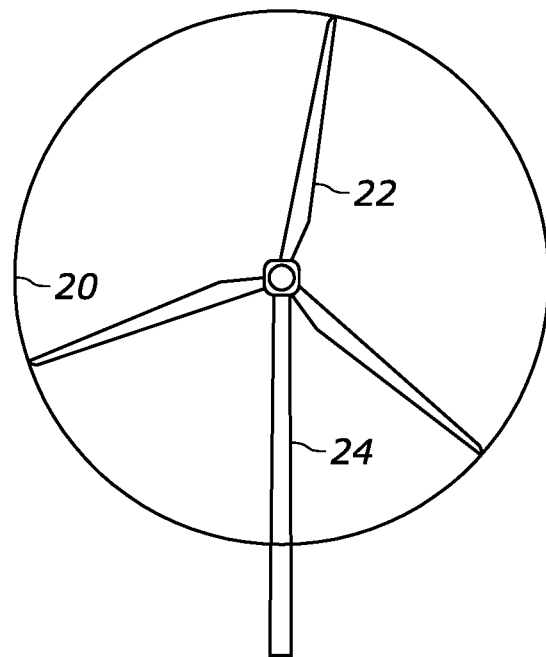
Figure 1C:
Figure 1D:
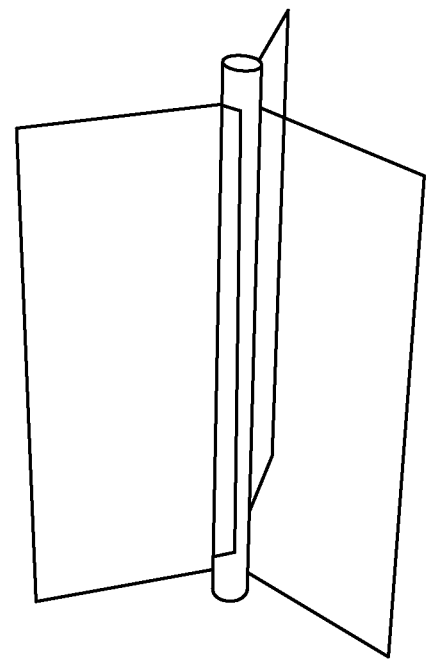
Figure 1E:
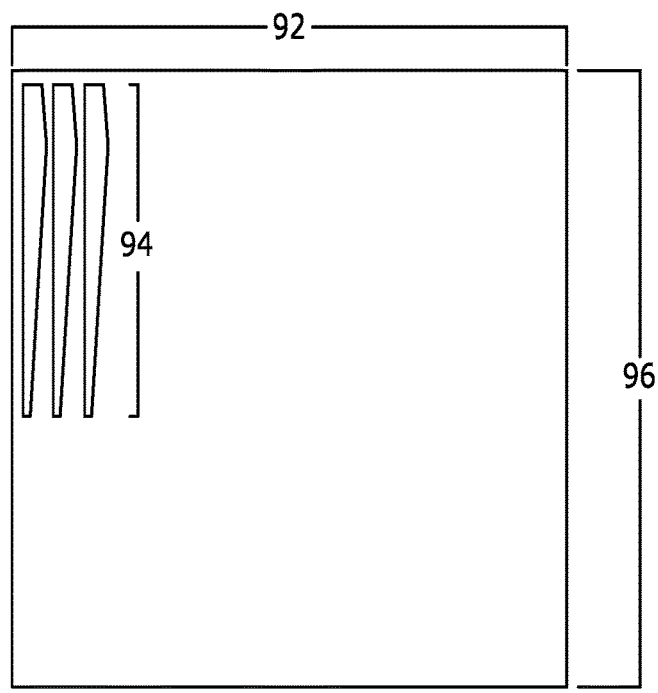
Figure 5B:
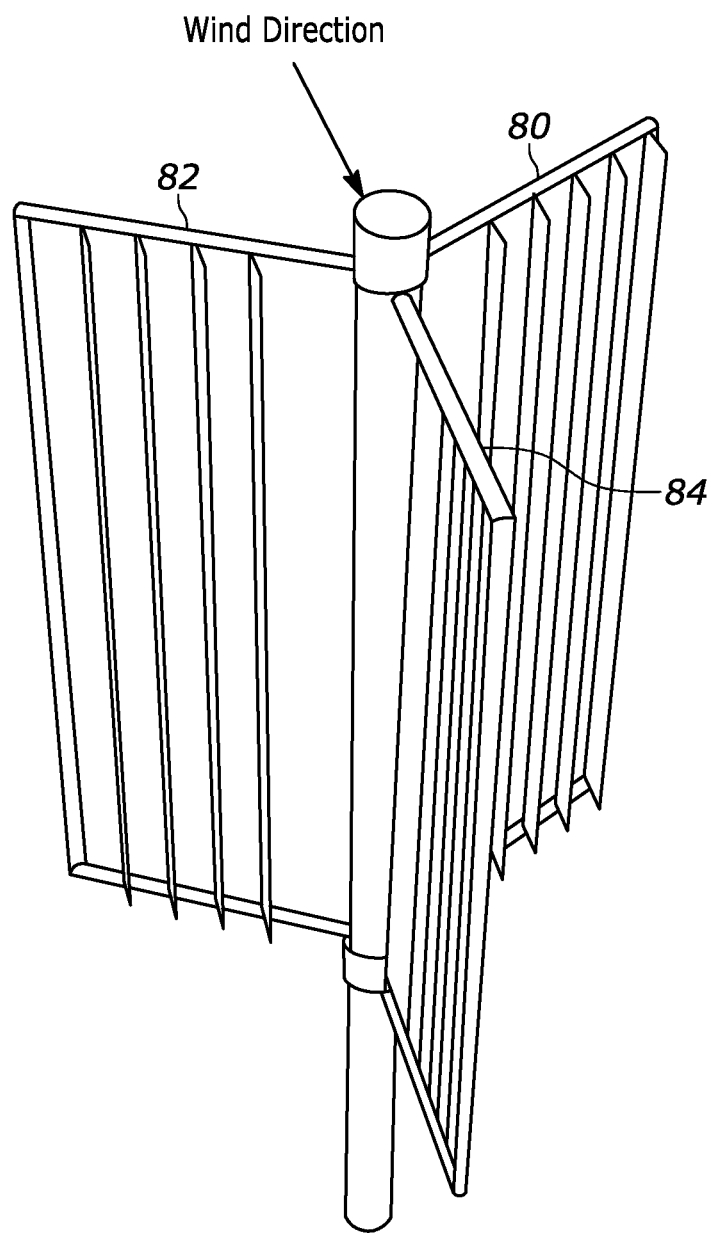

FIG. 5B shows a fully deployed wind capturing apparatus (FIG. 1D)

Figure 6A:
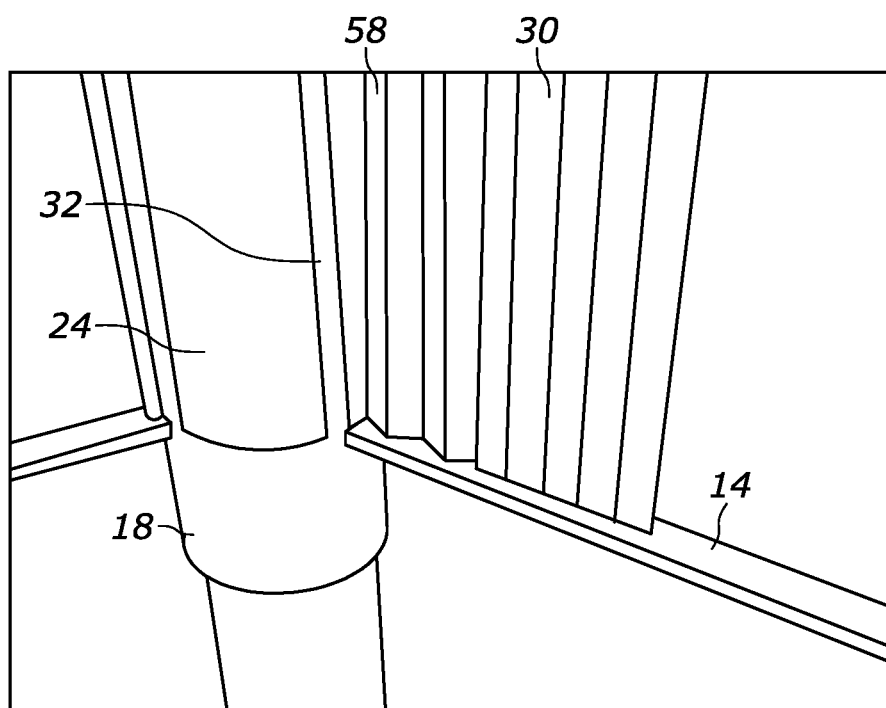

FIG. 6A shows a close-up near the bottom of the sail sections 30 (of two sail sections) as they are unfolding along one of the lower rail arms 14 (FIG. 6A).

Figure 6B:
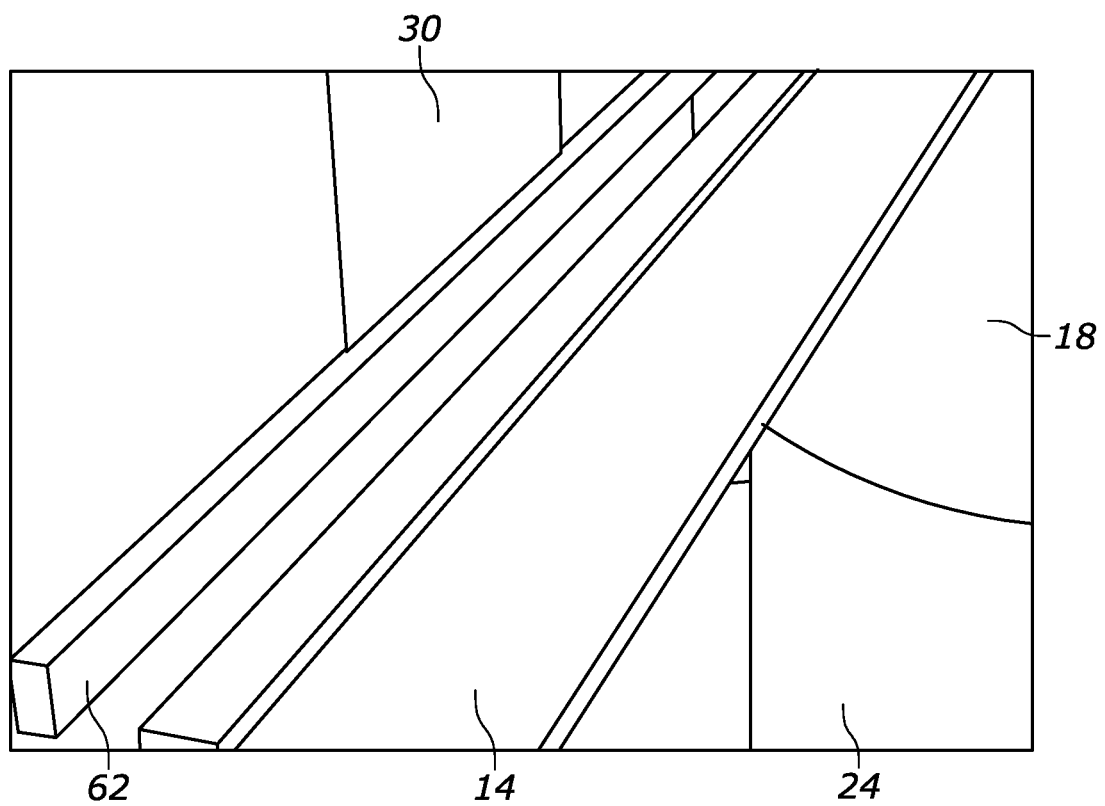

FIG. 6B show a perspective view of the lower end of a sail section 30 (FIG. 6B) and how the grouping panel 62 (FIG. 6B) keep the bottom (and top which is not shown) of the sail section 30 (FIG. 6A) flat and open.

Figure 6C:
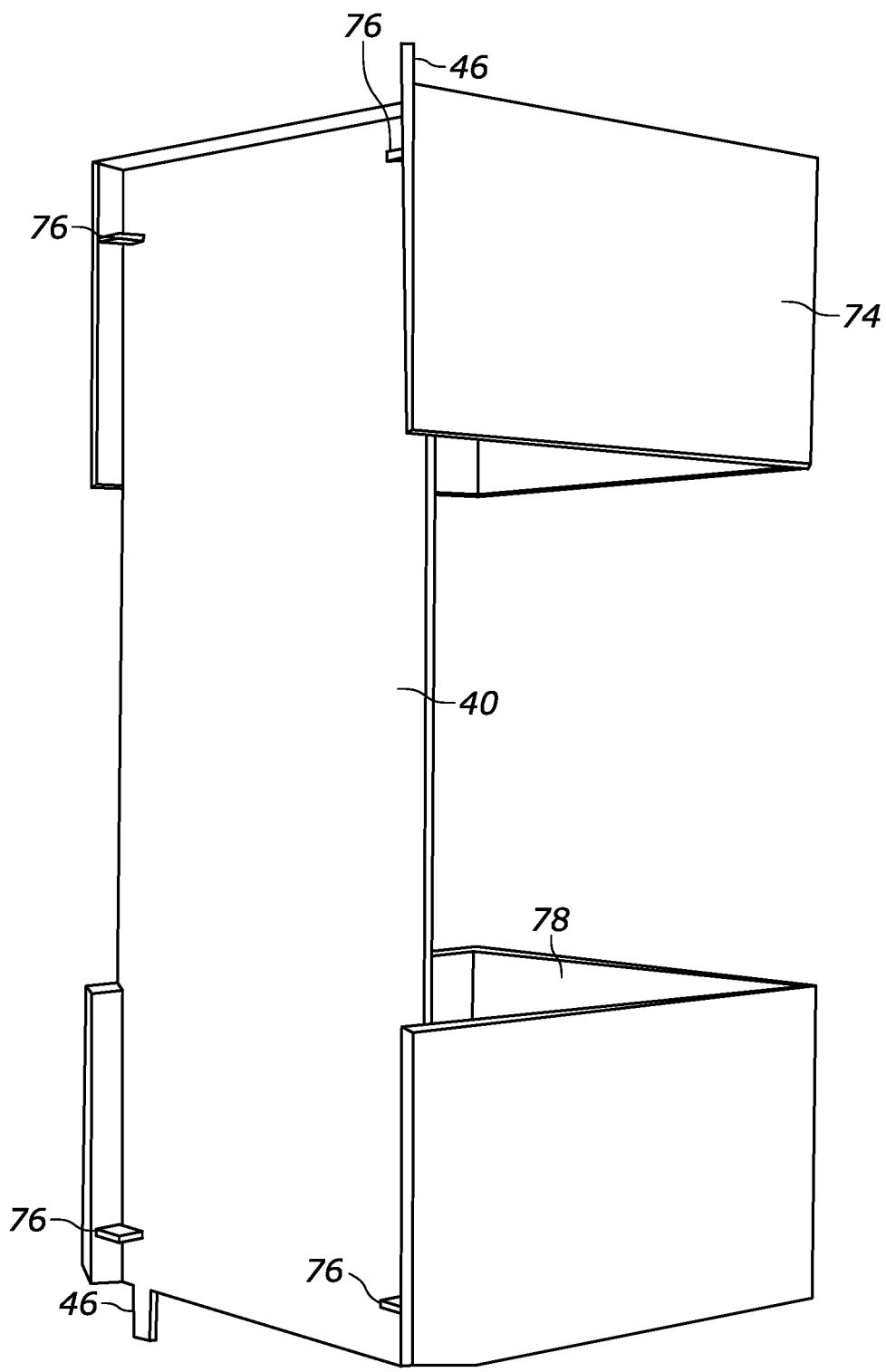

FIG. 6C represents an abbreviated drawing of a sail section rack with a hinged panel 40 (FIG. 6C) in it. This rack is positioned next to and against the rail arm mast 32 (FIG. 6A). It is where the sail sections 30 (FIG. 6A) are stored after they are folded into hinged panels 40 (FIG. 6C).

Figure 6D:
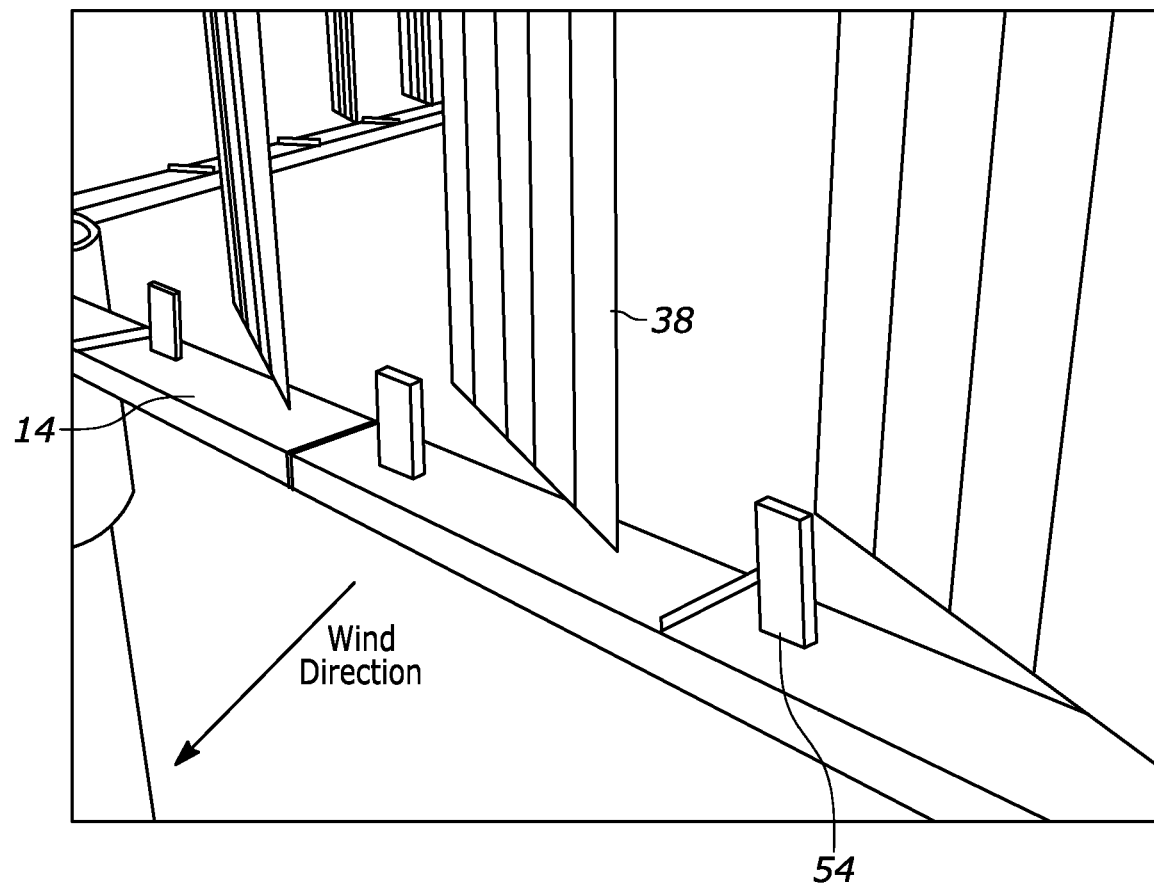

FIG. 6D shows how the sail section stoppers 54 (FIG. 8) and 54 (FIG. 6D) put sail sections 30 (FIG. 6A) into wind capturing mode.

Figure 6E:
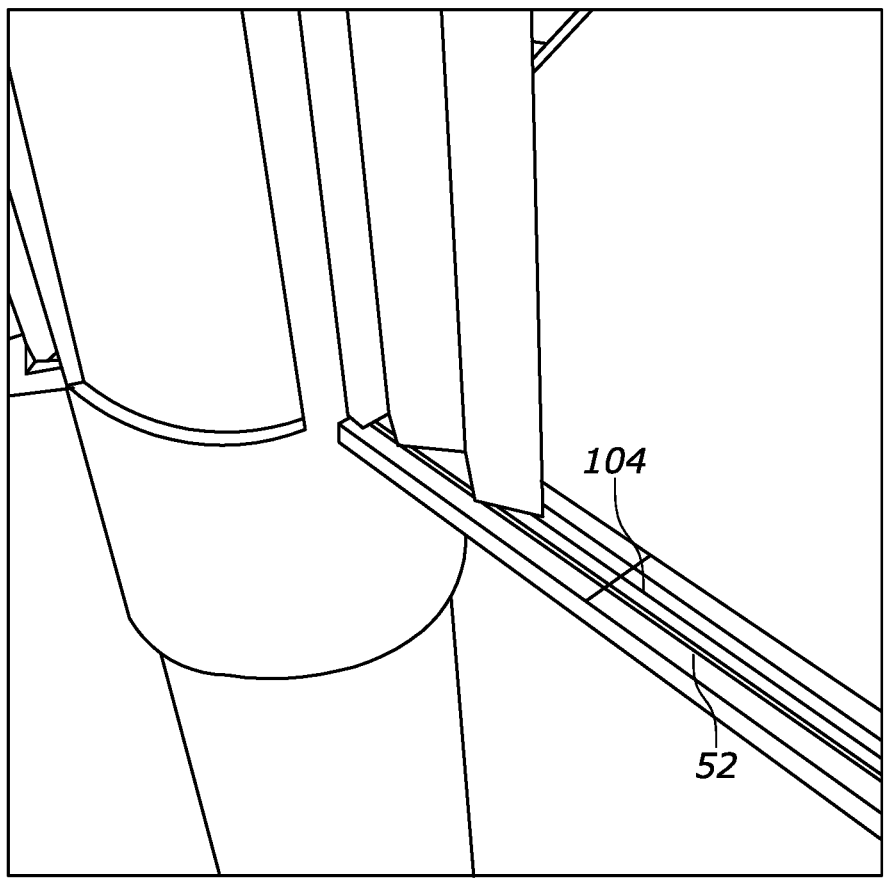

FIG. 6E show where the motors pull the motor guide pins 46 (FIG. 8) through the motor guide pin slot 104 (FIG. 6E) on the surface of the lower rail arm 52 (FIG. 6E).

Figure 6F:
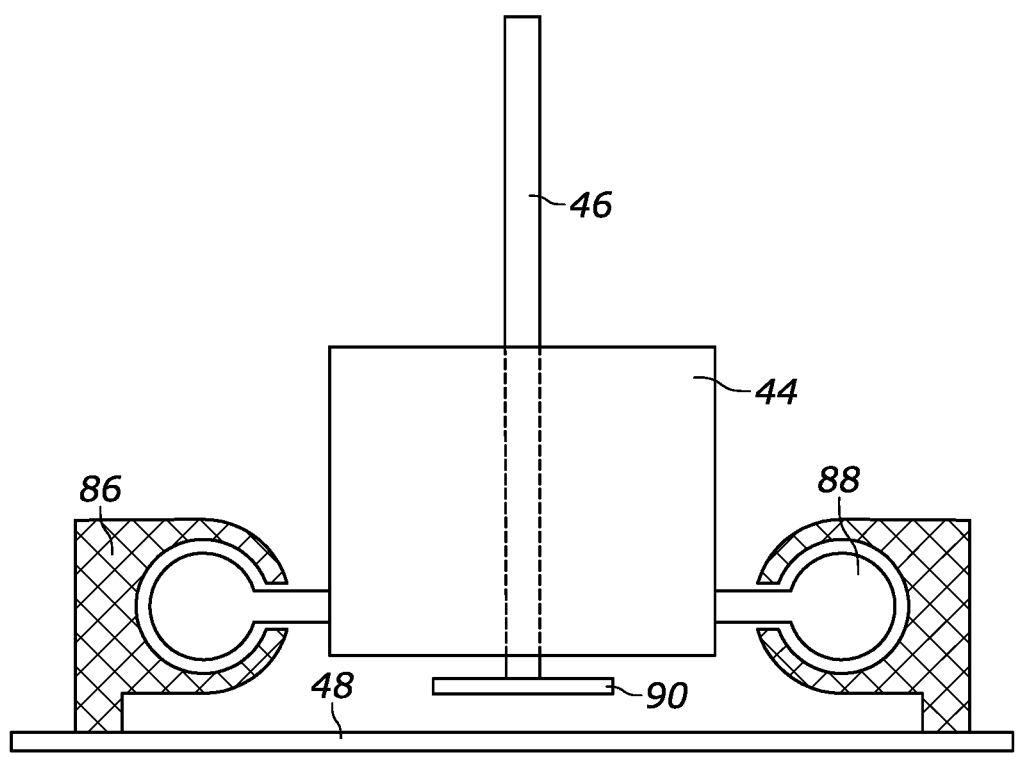

FIG. 6F shows a cross-section close up of a symbolic motor 44 (FIG. 6F) and how it is located on its motor tracks 86 (FIG. 6F). The motor and its parts are explained more in the operation section.

Figure 6G:
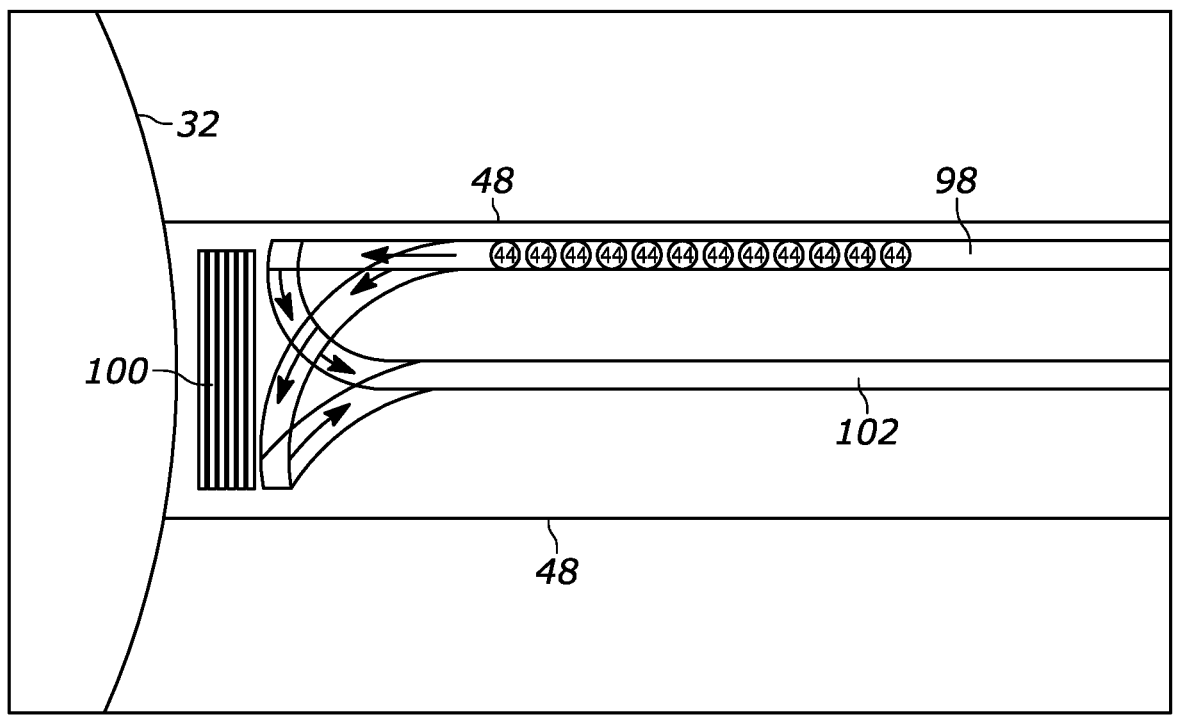

FIG. 6G shows a top down view of what is on the middle level 48 (FIG. 8). of the lower rail arm 14 (FIG. 3).

Figure 7A:
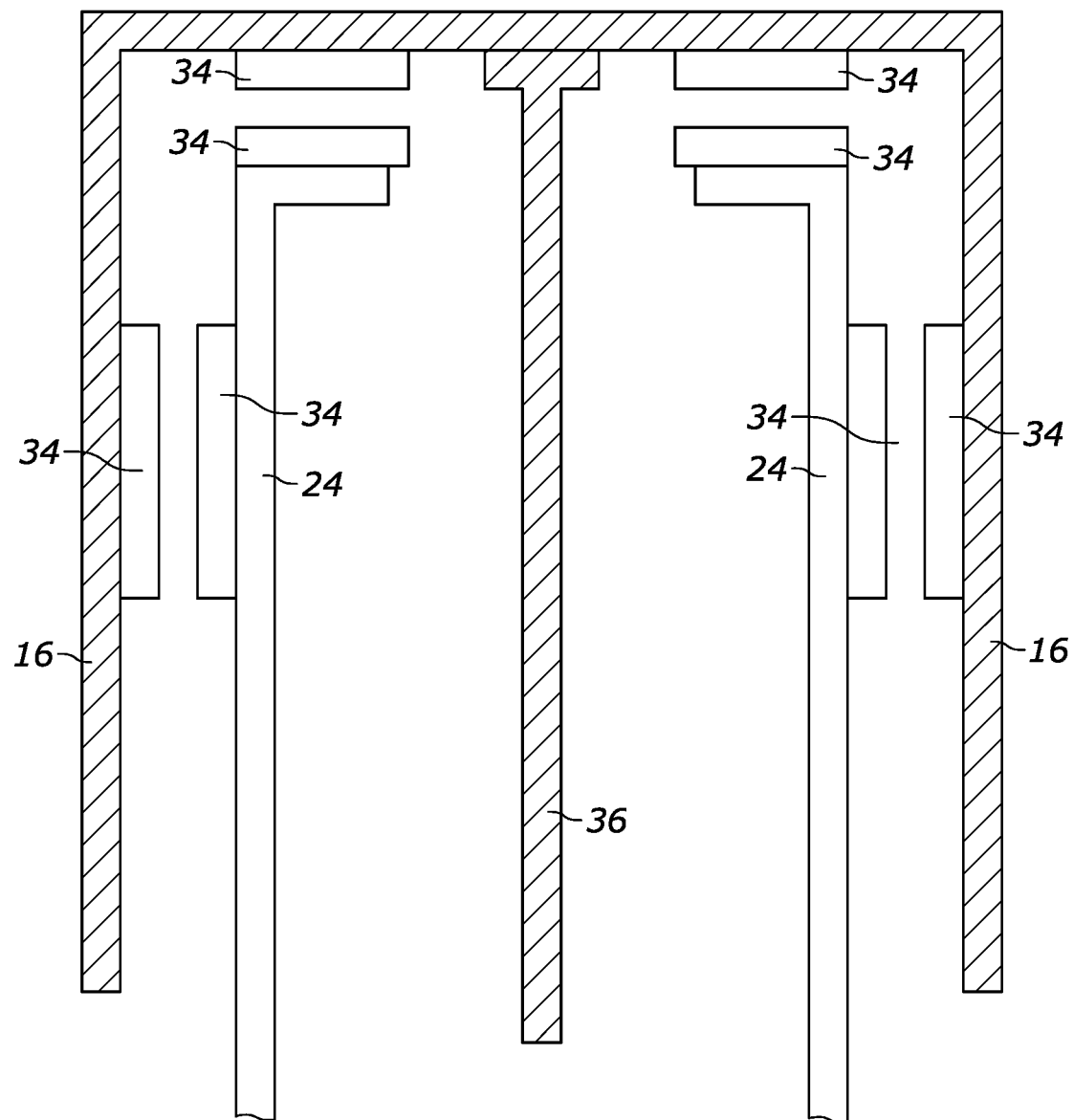

FIG. 7A shows a cross-section inside of the upper collar 16 (FIG. 3) and explains why the turbine is called frictionless.

Figure 7B:
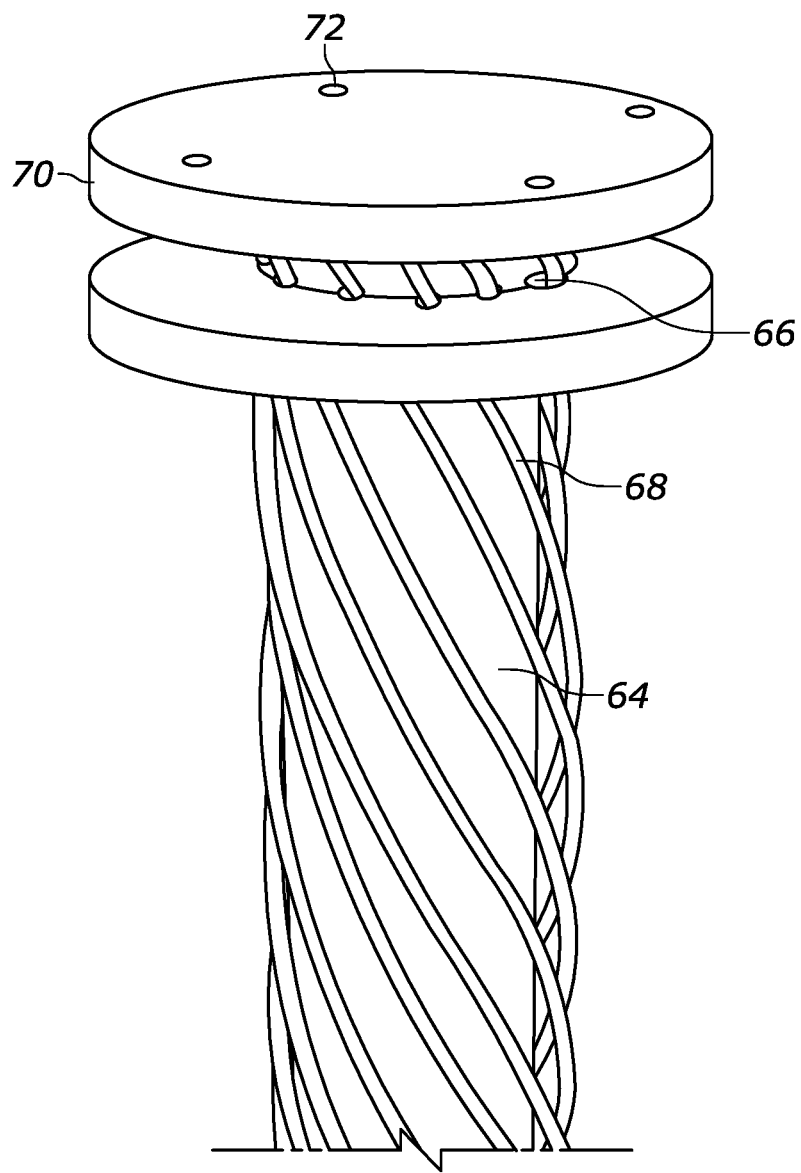

FIG. 7B represents a close-up of one end of a section of reinforced axis. The axis may need to be reinforced because of the possibility of the axis twisting from stress. It also shows its parts.

Figure 8:
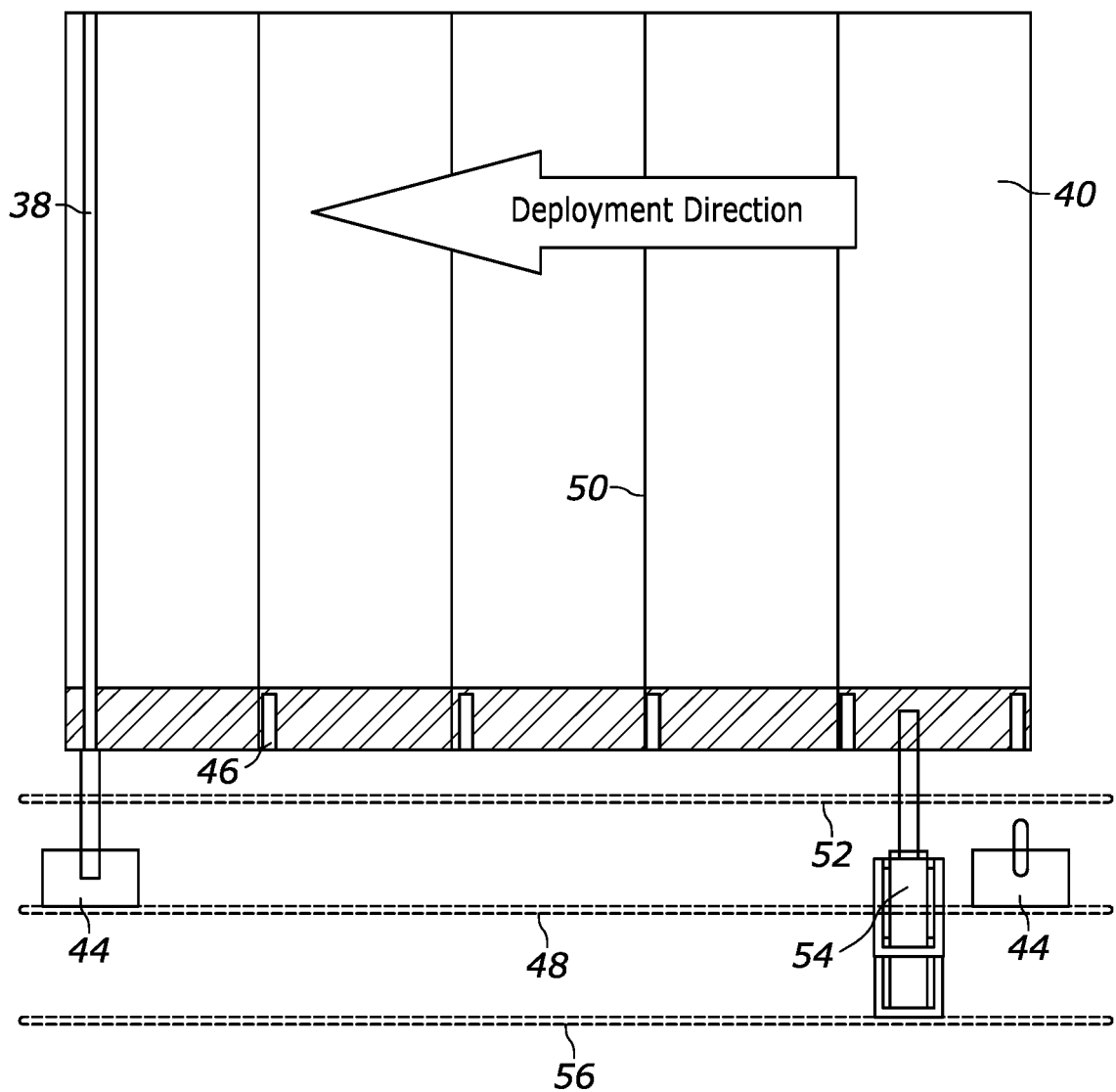
Figure 9A:
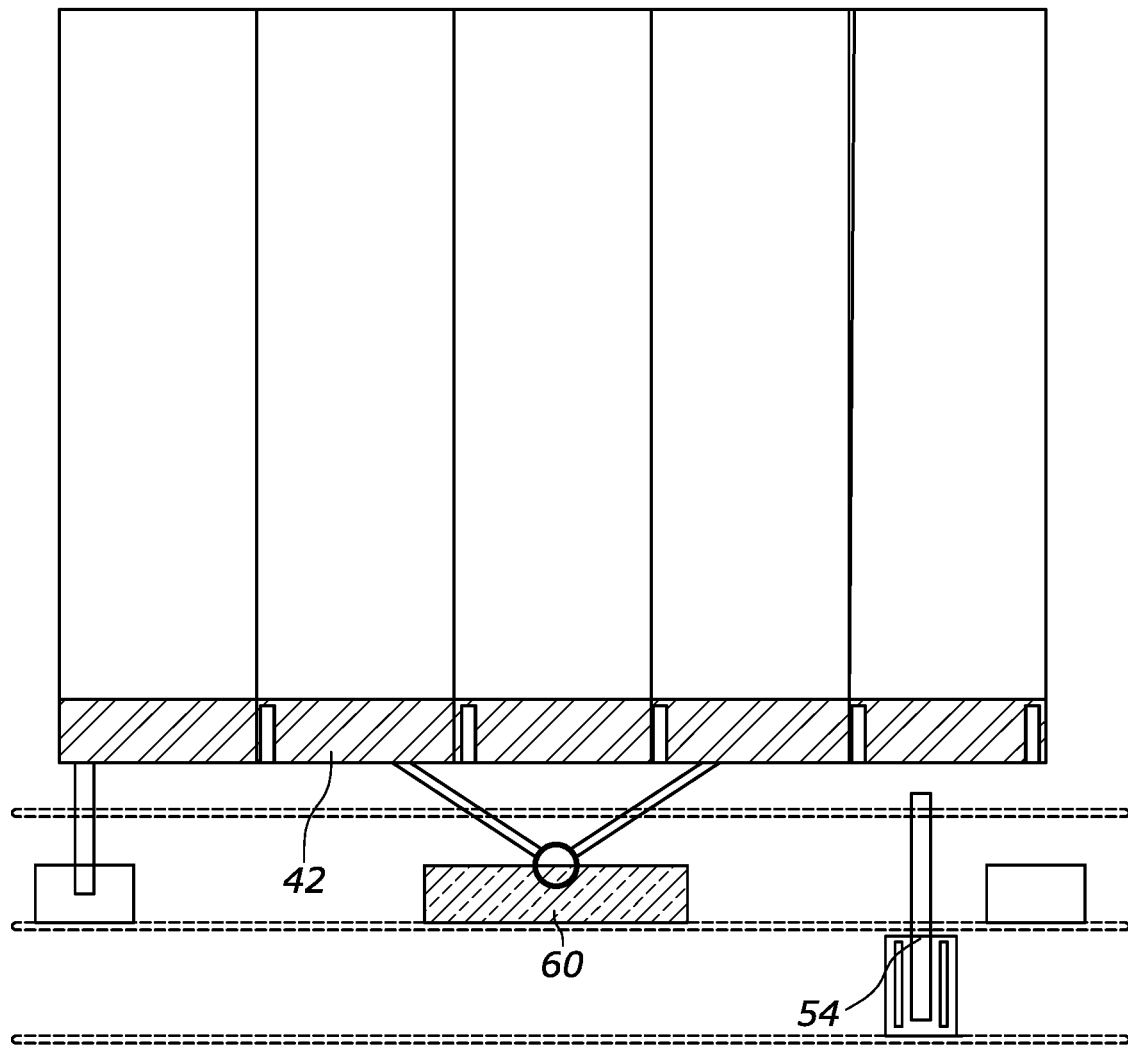

FIG. 8 to FIG. 9A show the lower end of a sail section 30 (FIG. 6A) and also shows the different parts of a sails section 30 (FIG. 6A) along with the parts that interact with it.

Figure 9B:
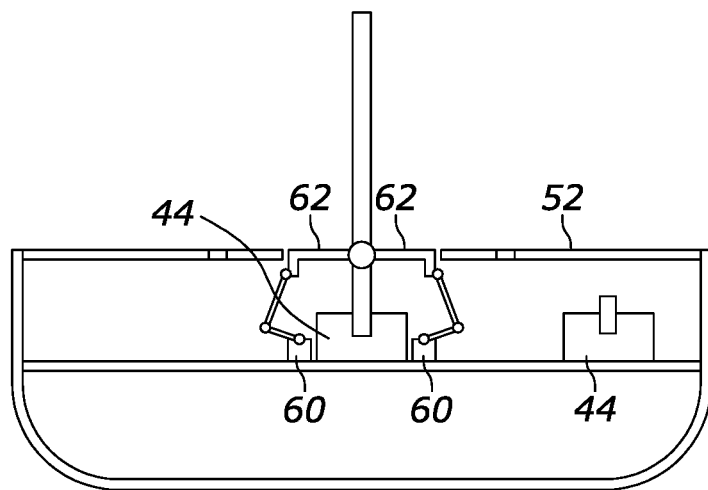
Figure 9C:
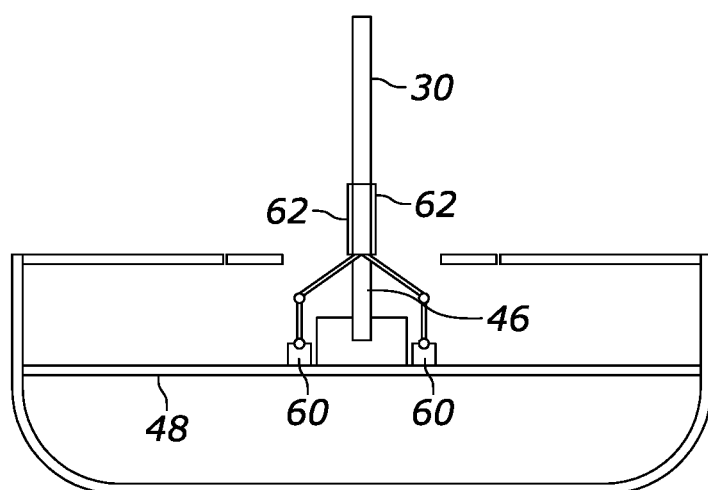

FIG. 9B to FIG. 9C shows a cross-section of a lower rail arm 14 (FIG. 6) from its end looking toward the tower, after the rail arm has been lowered. It shows some of the parts inside the rail arm. It gives a edgewise view of the lower end of the sail section 30 (FIG. 9C). It also shows where the motors 44 (FIG. 9B) are stored when the sail sections 30 (FIG. 9C) are not deployed out onto the rail arms.

Drawings—Reference Numerals 10 turbine in closed position
12 upper rail arms
14 lower rail arms
16 upper collar
18 lower collar
20 blade sweep area
22 blade
24 tower
26 rail arm supports
28 sails array
30 sails sections
32 rail arm mast
34 opposing electro magnets
36 axis
38 leading edge
40 hinged panel
42 bottom edge
44 sail pulling motor
46 guide and motor pin
48 middle level
50 hinge
52 lower rail arm top surface
54 sail section stopper
56 bottom of lower rail arm
58 folded sail sections
60 robot
62 grouping panel
64 main axis shaft
66 cable clamps
68 anti-twist cables
70 axis connecter
72 fastener holes
74 side of sail section rack
76 sail rack notches
78 back of sail section rack
80 rail arm number one
82 rail arm number two
84 rail arm number three
86 motor track
88 motor wheels
90 axis stay
92 sail width
94 blade length
96 sail length
98 storage track
100 stored sail section
102 rail arm track
104 guide pin slot

DETAILED DESCRIPTIONS—FIG. 1 THROUGH FIG. 9—FIRST EMBODIMENT

The detailed descriptions will be easy for you to assimilate because there are only six major parts and two major operating concepts. FIG. 1C is a basic depiction of the tower 24 (FIG. 6A). This is also the backbone of virtually all three bladed turbines. Inside the tower 24 (FIG. 6A) there will be several levels (floors) for workers to use while repairing or maintaining the turbine's operations. There will be a local generator for interior lighting and power to turn (spin) or operate the wind capturing apparatus (FIG. 1D) when the turbine is not creating its own power. There will be some stairs. The main generator will also be inside the tower. The main generator sends power out into the community. There could also be an elevator. In today's three bladed turbines the main generator sits atop the tower inside the nacelle. In this new embodiment it is not, but could be. There are no drawings of most of what is inside the tower because they are not germane to the new advancements. However, I believe the tower 24 (FIG. 6A) for this new embodiment of a wind/ocean current capturing turbine, will be much larger in diameter than today's turbines because it may have to carry much more weight. This may also make it necessary to build the turbine on site.

There are only six major parts to this turbine. You have already assimilated the first one. That was the tower 24 (FIG. 3) and 24 (FIG. 6A). The second major parts are the rail arms. The upper rail arms 12 (FIG. 3) and the lower rail arms 14 (FIG. 3). Let me say one thing about future information regarding the rail arms. I use the lower rail arms 14 (FIG. 3) to explain or describe much of how the turbine operates. Assume that everything I say about the lower rail arms 14 (FIG. 3) also applies to the upper rail arms 12 (FIG. 3). If there are any differences I will explain them when it is relevant. Notice in FIG. 2 the rail arms are folded against the side of the turbine. This is when the turbine is in the closed position. The rail arms are partially covering where the sails sections 30 (FIG. 6A) are being stored. FIG. 6A shows how the sail sections 30 (FIG. 6A) unfolds when they deploy out onto the lower rail arm 14 (FIG. 6A). The upper rail arms 12 (FIG. 3) and the lower rail arms 14 (FIG. 3) hold the sails sections 30 (FIG. 6A) between them after deployment in order to capture the wind/ocean currents. That pretty much covers the description of the rail arms. Let's quickly cover the rail arm supports 26 (FIG. 4) and we will be halfway through the major parts of this turbine. After the upper rail arms 12 (FIG. 3) and the lower rail arms 14 (FIG. 3) fully open, the rail arm supports 26 (FIG. 4) move out to the ends of the rail arms. The purpose of the rail arm supports 26 (FIG. 4) are to keep the rail arms at a constant distance apart. Without rail arm supports 26 (FIG. 4), the wind may force the rail arms further apart or closer together. This could damage the sails array 28 (FIG. 5), because the sails array 28 (FIG. 5) is not made to stretch. If the rail arms moved too far apart from each other it could damage the sails array 28 (FIG. 5).

It should be noted that five of the six major parts of the turbine make up what I call the wind capturing apparatus (FIG. 1D). The wind/ocean current capturing apparatus (FIG. 1D) sits atop and surrounds the upper portion of the tower 24 (FIG. 6A). When the sails sections 30 (FIG. 6A) are fully deployed, the wind/ocean current capturing apparatus (FIG. 1D) may spin around the tower. The wind/ocean current capturing apparatus (FIG. 1D) does not touch any part of the tower 24 (FIG. 6A). This is why frictionless is part of the name of this turbine. Please direct your attention to (FIG. 7A) for a description of what is inside the upper collar. This is a cut-a-way of the top end of the turbine showing a cross-section view of the upper collar 16 (FIG. 7A) and what is inside. This view of the upper collar 16 (FIG. 7A) does not include where the upper collar is connected to the upper rail arms. It also does not show where there would be a top floor inside the tower 24 (FIG. 7A) along with where the elevator shaft would end. This cross section only explains the frictionless component of the turbine.

Please note the eight darkly shaded rectangles that represent opposing electro-magnets 34 (FIG. 7A). These are why this machine is called frictionless. Please note that none of the electro-magnets 34 (FIG. 7A) are touching. Four of them are attached to the tower 24 (FIG. 7A). The other four are attached to the upper collar 16 (FIG. 7A). Nothing that touches the tower 24 (FIG. 7) touches the upper collar 16 (FIG. 7A). This is because the electro-magnets keep them apart. This frictionless technology is borrowed from the technology used to manufacture maglev trains. There are also opposing magnets in the lower collar 18 (FIG. 3) to keep the lower section of the wind capturing apparatus separate from the tower as it spins around the tower, but I don't believe that drawing is needed. Please note that the axis 36 (FIG. 7A) is attached to the top part of the upper collar upper collar 16 (FIG. 7A) and the axis 36 (FIG. 7A) and the upper collar 16 (FIG. 7A) spin together due to them being fastened directly to each other. Now you know half of the major operating principles of this turbine (the frictionless concept).

Let's quickly go over the last operating principle of this turbine. This turbine is more collapsible then any in the past. FIG. 6A shows some of why this is possible. You can see how the sails sections 30 (FIG. 6A) can be folded against the rail arm mast 32 (FIG. 6A) in what I call a sail section rack (FIG. 6C). The first embodiment of this turbine does not have to have specific dimensions. However to help in the visualization of what it could be, I will give you a token description. FIG. 6C shows a shortened representation of a sail section rack. The hinged panel 40 (FIG. 6C) represents the smallest part of a sail section 30 (FIG. 6A). An entire sails array 28 (FIG. 5) could consist of six sails sections 30 (FIG. 6A). This picture 30 (FIG. 6A) shows two sail sections. One is flat and the other is folded. The flat section shows two shades of colors. Where the colors meet represent where each part of the sail section 30 (FIG. 6A) is hinged. In our token description of a sail section 30 (FIG. 6A), each hinged panel 40 (FIG. 6C) is 5 feet wide. In our token description of this embodiment there are five hinged panels 40 (FIG. 6C) in each sail section 30 (FIG. 6A) There are six sails sections 30 (FIG. 6A) to a sails array 28 (FIG. 5) and each sail section 30 (FIG. 6A) is about 425 feet tall. That would make one sail array 28 (FIG. 5) 150 feet wide and 425 feet tall.

All of the sails arrays 28 (FIG. 5) would fold into 5 foot wide hinged panels 40 (FIG. 12) and be stored in the sail section rack (FIG. 6C). The back of the sail section rack 78 (FIG. 6C) is attached to the rail arm mast 32 (FIG. 6A). I think that explains the collapsible function of the turbine (more in the operations section). A description of the sails array 28 (FIG. 5) was covered while explaining how the sail section 30 (FIG. 6A) portion of the turbine is collapsible. The sail array 28 (FIG. 5) was the fourth major part of the turbine. The last two major parts of the turbine are the rail arm mast 32 (FIG. 6A) and the collars. The upper collar 16 (FIG. 3) and the lower collar 18 (FIG. 3) were explained in how they help to make the turbine frictionless. However, it should be noted that the upper collar 16 (FIG. 3) and the lower collar 18 (FIG. 3) are at each end of the rail arm masts 32 (FIG. 6A). The rail arm mast 32 (FIG. 6A) and the collars meet in the general vicinity of the upper rail arms 12 (FIG. 3) and the lower rail arms 14 (FIG. 3). You now know all six of the major parts of the turbine and the two main operating principles of the turbine.

Four of the six major parts of the turbine are fairly static. I will name those four now, so that we can mentally put those behind us until the operation's section. The rail arm supports 26 (FIG. 4), the upper and lower collars 16 & 18 (FIG. 3), the rail arm masts 32 (FIG. 6A), and the tower 24 (FIG. 6A) will be brought up again in the operations section. We will have to take a detailed look at the sails sections 30 (FIG. 6A) and the rail arms 12 & 14 (FIG. 6) together because it is almost impossible to explain one without explaining the other. Please take a look at FIG. 8 and FIG. 9A. They are basically the same. There was too much information for one figure picture and would have crowded one page. A general description of FIG. 8 and FIG. 9A would be the lower 10 or 15 feet of a sail section 30 (FIG. 6A). The bottom edge 42 (FIG. 8) represents the bottom of the sail section. Beneath that you will find three double horizontal lines. That area represents a cutaway of a side view of the lower rail arm 14 (FIG. 6A) as the sail section 30 (FIG. 6A) is deployed above it. The lower rail arm's top surface are represented by 52 (FIG. 6E) and 52 (FIG. 8). There is a middle level 48 (FIG. 8) where the sail pulling motors 44 (FIG. 8) operate. The bottom of the lower rail arm 56 (FIG. 8) is self-explanatory.

There are six guide and motor pins 46 (FIG. 8) in each sail section 30 (FIG. 6A). The guide and motor pins 46 (FIG. 8) protrude from the bottom edge 42 (FIG. 8) of the sails sections when needed to connect to a sail pulling motors 44 (FIG. 8) or to guide the sails sections through the guide slot 104 (FIG. 6F). Please look at the sail pulling motor 44 (FIG. 8) on the left. You can see that one of the guide and motor pin guide like 46 (FIG. 8) has protruded down to connect with the sail pulling motor 44 (FIG. 8) on the left. The first and last guide and motor pins 46 (FIG. 8) of each sail section 30 (FIG. 6A) is located over the motors to protrude to connect with the sail pulling motors 44 (FIG. 8), that deploy the sail section 30 (FIG. 6A) out onto the rail arms and also to retract (return) the sail section 30 (FIG. 6A) to their storage area. The hinge 50 (FIG. 8) is where each of the hinged panels 40 (FIG. 8) folds. The leading-edge 38 (FIG. 8) of each sail section is hardened because that end of the sail section will be a pivot point for the entire sail section 30 (FIG. 6A). There are three parts needed to finalize the deployment of each sail section 30 (FIG. 6A). To keep each group of sail section 30 (FIG. 6A) flat (unable to fold) a grouping panel 62 (FIG. 6B) is placed on each side of the bottom edge 42 (FIG. 9A). The grouping panels 62 (FIG. 9C) and 62 (FIG. 6B) are put in place there by robots 60 (FIG. 9A). The lagging edge of each sail section is the opposite end from the leading-edge 38 (FIG. 8). The lagging edge of each sail section's 30 (FIG. 6A) movements are restricted by a sail section stopper 54 (FIG. 8). They protrude upward from the lower rail arms 14 (FIG. 3) and downward from the upper rail arms 12 (FIG. 3) to restrict or free-up the movements of the sail sections 30 (FIG. 7B) when necessary.

Please go to FIG. 7B where you will see a new adaptation of part of the main axis shaft 64 (FIG. 7B). The axis shaft 36 (FIG. 7A) could be a series of simple steel rods that are connected to the main generator at one end and connected to the inside of the upper collar 16 (FIG. 7) at the other end. However, in my token example of the first embodiment the main generator is on ground level. This shows the axis 36 (FIG. 7A) would have to be about 425 feet long. I believe that any axis that long would be susceptible to twisting and breaking under the stress of spinning the generator. So, the main axis shaft 64 (FIG. 7B) is an alternative axis to make it stronger. There would be an axis connector 70 (FIG. 7B) at both ends of each the main axis shaft 64 (FIG. 7B). One of these would be at each end of the main axis shaft 64 (FIG. 7B). The axis connectors 70 (FIG. 7B) would fit snugly on each end of the main axis shaft 64 (FIG. 7B) and be able to turn as if it were being spun (similar to a screw on bottle top). The axis would have around it several anti-twist cables 68 (FIG. 7B). These cables would be fastened to the axis connectors 70 (FIG. 7B) at each end by cable clamps 66 (FIG. 7B). The other end of the main axis shaft 64 (FIG. 7B) would be just like the one shown here in (FIG. 7B). Each section of axis would be connected by the fastener holes 72 (FIG. 7B) shown in the drawing. I will now explain why I believe it might work better than plain steel pipe (rod). As the axis begins to be twisted by the spinning of the wind/ocean current capturing apparatus (FIG. 1D) The anti-twist cables 68 (FIG. 7B) would tighten up around the main axis shaft 64 (FIG. 7B) instead of twisting the main axis shaft 64 (FIG. 7B) itself. This would transfer the tension away from the shaft itself and onto the anti-twist cables 68 (FIG. 7B) instead.

Please go to (FIG. 6F) and (FIG. 6G). This (FIG. 6F) is a close-up cross-section of a sail pulling motor 44 (FIG. 6F) and the track it travels on. If you look at the motor track 86 (FIG. 6F) you can see that it surrounds both motor wheels 88 (FIG. 6F). This keeps the motors (which are upside down) in the upper rail arm's 12 (FIG. 3) from falling. The tracks are fastened to the middle level of the upper rail arms 12 (FIG. 3) and the lower rail arms 14 (FIG. 3).

Operation—FIG. 1 through FIG. 9

To understand how much of an advancement this new turbine is over the 3 bladed turbine, I will give you an illustration of how much more of the wind is captured by the new turbine. But first direct your attention to FIG. 1A and FIG. 1B. FIG. 1B shows an image of a 3 bladed turbine as it sits atop its tower 24 (FIG. 1B). To start to make the comparison, please view the blade sweep area 20 (FIG. 1B). Let's use some hypothetical dimensions to make some data on the 3 bladed turbine. Take a look at FIG. 1E. In the upper left hand corner of the grey area you will find an 'in scale' representation of three turbine blades. Let's say they have a blade length 94 (FIG. 1E) of 229 ft. That would give us a blade sweep area 20 (FIG. 1B) of 164,664 sq. ft. using the square feet of a circle formula.

Without going through a full mathematical explanation, I will show logically the wind capture square footage of the new embodiment. When one of the sails arrays is completely open to the wind its maximum wind capturing area is 63,750 ft.$^2$. And its minimum wind capturing area is one half of that (31,875). Adding those two numbers and then dividing them by two will give us the average wind capturing area (47,812). We need to make one last adjustment in order to compare the two types of turbines on a more equal basis. We have to scale up the average square footage (47,812) of the sails array to the 164,664 ft.$^2$ of the three bladed sweep area sample in FIG. 1B. That will take a 344.07% increase. Let me first say it's very difficult to make a true comparisons between the three bladed turbine and the new embodiment. The wind sweep area 20 (FIG. 1B) and the wind capture areas of the new embodiment are so different that I am going to have to conflate the two a bit. So if you take a look at FIG. 1E you will see the blades 94 (in scale) on a background that represents the total wind sweep area. The wind sweep area is now in a rectangular shape instead of a circle. The three blades 94 represent the amount of wind that is captured and the background (minus the three blades) represents the square footage of wind that is not captured by the three bladed turbine.

Figure 1F:
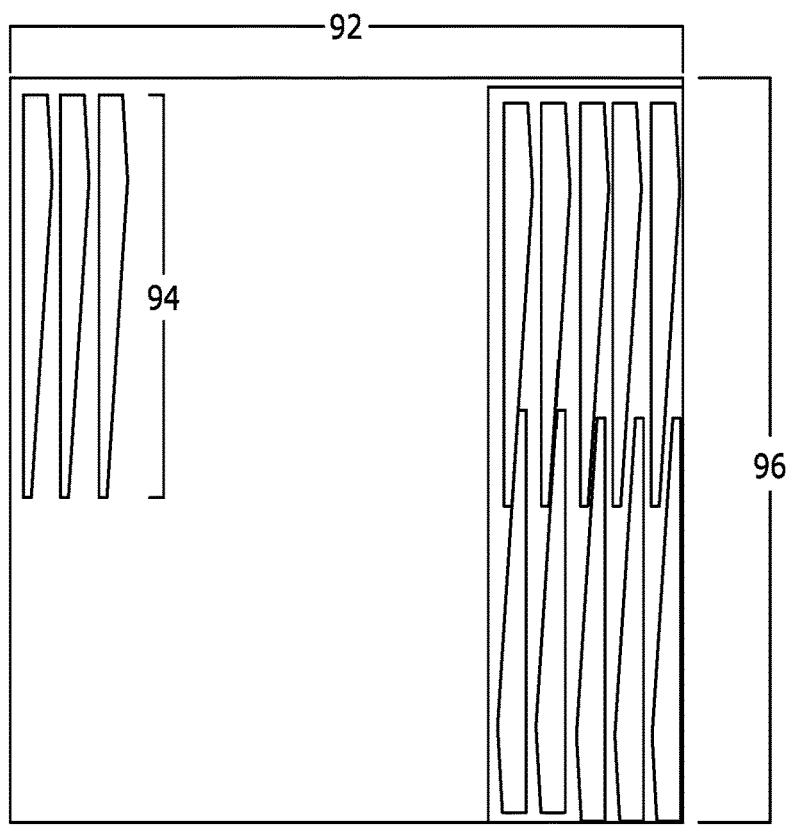

Now take a look at FIG. 1F. It is the same as FIG. 1E except for one difference, the rectangle on the right side of the background, filled with blades, represents the average wind capture area of the new embodiment with a sails array that is 425 feet tall and 150 feet wide. Clearly the new embodiment captures at least three times the wind of the three bladed turbine. But that is not the whole story. When we scale up the average wind capture area of the new embodiment equal to the blade sweep area of the old three bladed turbine. As stated earlier, the blade sweep area of our three bladed turbine is about 164,664 ft.$^2$. The average wind capture area of the sails array 28 (FIG. 5) on the new embodiment it is only 47,812 ft.$^2$. We scaled up our sails array 28 (FIG. 5) 344% to be equal to the blade sweep area of the three bladed turbine. Now let's scale up the 10 blades on the right side of FIG. 1F by 344%. That would be 34 blades instead of 10. So, the old 3 bladed turbine gives you 3 blades of wind capturing area (1 turbine) and the scaled up new embodiment gives you 34 blades of wind capturing area (10 turbines).

Now you're talking about capturing nine times the wind with a comparable size new embodiment turbine. Of course it's not that clear-cut. There are other issues that have to be taken into account. But if it only captures four times the wind has its comparable predecessor it would truly be revolutionary in the industry. There is a slight and unaccounted for drag factor. Imagine if you were standing directly upwind from the new turbine. You would see the sail sections 30 (FIG. 6A) close ranks to capture the wind on the left side of the tower 24 (FIG. 6A). You would see the sail sections 30 (FIG. 6A) open to let the wind flow through on the right side of the tower 24 (FIG. 6A). The right side would create some drag. The amount would depend on how aerodynamic we make the leading edges 38 (FIG. 8) and the sides of the sail sections. This becomes clear later Let's start at the beginning of the large size wind turbine embodiment and show how it opens up and deploys when the wind speeds are safe for it to do so. It should be noted at this time that the reason wind turbines are not made bigger is because the wind would be more of a hazard to them. This is why a turbine that captures more wind probably has to be built to hide from the wind or be made collapsible. Let's go through the new embodiments operations procedure. Let's start at FIG. 2. This is when it is fully retracted (collapsed). This is how it would have to be in a wind storm or tornado. FIG. 1D shows you the wind capturing apparatus before the sails come out. Let's go to FIG. 3 now. This is when deployment has started. First, the upper rail arms 12 (FIG. 3) and the lower rail arms 14 (FIG. 3) open out until they are perpendicular to the tower 24 (FIG. 6A). Next, the rail arm supports 26 (FIG. 4) move away from the rail arm mast area 32 (FIG. 6A) and go out to the ends of the upper rail arms 12 (FIG. 3) and the lower rail arms 14 (FIG. 3). This is done to stabilize the upper rail arms 12 (FIG. 3) and the lower rail arms 14 (FIG. 3). This may not be necessary depending which embodiment is being produced or the size of the embodiment. The wind might cause the rail arms to fluctuate and break or tear the connection with the sails sections 30 (FIG. 6A), if not for the rail arm supports 26 (FIG. 4). Now that the wind capturing apparatus (FIG. 1D) framework is out, the hinged panel 40 (FIG. 6C) can be pulled out between the upper rail arms 12 (FIG. 3) and the lower rail arms 14 (FIG. 3) to unfold into sail sections. Please remember the hinged panels 40 (FIG. 6C) are actually the sail sections 30 (FIG. 6A) while they are folded and stored in the sail section rack (FIG. 6C). In FIG. 6A you can see how the sail sections 30 (FIG. 6A) unfold each section at a time and are pulled out along the lower rail arm 14 (FIG. 3). Before we go into how the sails sections 30 FIG. 6A) are pulled out we need to go over some pre-required knowledge that will assist your learning curve. These prerequisites will help the visual assimilation of this new material. The sail sections 30 (FIG. 6A) are pulled out between the upper rail arms 12 (FIG. 3) and the lower rail arms 14 (FIG. 6A). The only difference is that the upper rail arms 12 (FIG. 3) are built stronger because they hold the weight of the sail sections 30 (FIG. 6A). So, when I refer to what the sails section 30 (FIG. 6A) is doing on the lower rail arm 14 (FIG. 3), please assume that it is doing the very same thing with the upper rail arm 12 (FIG. 3).

There is one more thing you need to know before you can deploy the first set of sail sections 30 (FIG. 6A). Go to FIG. 5. Please note that the sail array 28 (FIG. 5) is equal to the sail sections 30 (FIG. 6A) after they are fully deployed. Please note the wind direction arrow. When the sails sections 30 (FIG. 6A) are being deployed, the appropriate rails arm 12 and 14 (FIG. 3) must be aligned (as good as possible) with the wind, because if the entire sail array 28 (FIG. 5) is 425 feet tall and 150 feet wide (hypothetically), the wind would begin to push the wind capturing apparatus (FIG. 1D) around before all the rail arms are full of sail sections 30 (FIG. 6A). There is a procedure that has to be followed and that has to take the power of the wind (or ocean currents in another embodiment) under consideration.

Now would be an appropriate time to go over how to position the wind capturing apparatus (FIG. 1D) in order to deploy the sail sections 30 (FIG. 6A) onto the rails arms 12 and 14 (FIG. 3). But first, let's take a detour to FIG. 7A. FIG. 7A shows a cross section of the upper collar 16 (FIG. 3). What you need to notice about the upper collar (FIG. 7A) sectional view is that it shows how the tower 24 (FIG. 7A) and its opposing electro-magnets are not touching the upper collar 16 (FIG. 7A) and its electro-magnets 34 (FIG. 7). The lower collar 18 (FIG. 3) has a similar arrangement, but it only needs the opposing electro-magnets on the walls. That illustration is not shown. This technology is similar to the Maglev train technology. Maglev technology is where passenger trains float over a bed of opposing electro-magnets in order for trains to reach high traveling speeds. This is also why I call this embodiment frictionless. A local generator is used to turn the wind capturing apparatus (FIG. 1D) into position for the deployment of the sail sections 30 (FIG. 6A). The maglev train travels along a straight line of rail. This machine travels in a circle, revolving the wind capturing apparatus (FIG. 1D) around the tower 24 (FIG. 6A) placing a rail arm into position (downwind) in order to deploy the sail sections 30 (FIG. 6A).

Please notice in FIG. 5 that the upper rail arm 12 (FIG. 3) has a new number. This has to do with procedure rather than a name label. In this illustration it is not just a upper rail arm 12 (FIG. 3). It is also rail arm number one 80 (FIG. 5) (the first rail arm to be filled with sail sections). Please notice how it is also directly aligned with the wind direction (as mentioned previously).

For the details on the mechanical operation that make the deployment possible please go to FIG. 8. This drawing represents a side view of the lower section of one sail section 30 (FIG. 6A) and a cross section of one of the lower rail arm 14 (FIG. 6A). Toward the bottom of FIG. 8 you can see the lower rail arm top surface 52, the middle level 48 of the lower rail arm 14 (FIG. 6A), and the bottom of the rail arm 56 (FIG. 8). Please notice the direction of deployment shown by the arrow labeled deployment direction and the leading edge 38 (FIG. 8). The leading edge 38 (FIG. 8) goes along the front edge of the sail section 30 (FIG. 6A) and is attached to one of the guide and motor pin 46 (FIG. 8) that is also attached to one of the motors 44 (FIG. 8). Note that the other motor is not attached to the other end of the sail section. Both motors are attached when the sail sections 30 (FIG. 6A) are being deployed and when they are being retracted. No motors are attached after the sail sections 30 (FIG. 6A) are folded and stored in the sail section rack (FIG. 6C). Only the leading motor is attached after the sail sections 30 (FIG. 6A) are fully deployed (for reasons that will become apparent later). Please note that this sail section (FIG. 8) has 6 guide and motor pins 46 (FIG. 8) on this embodiment.

Now go to FIG. 9B. This is another cross section view of a lower rail arm 14 (FIG. 3). This view is from the end of the rail arm looking toward the tower. You can see the lower rail arm top surface 52 (FIG. 9B) and the middle level 48 (FIG. 9C). FIG. 9B shows two motors 44 (FIG. 9B). The one on the left shows where the motors are after they pull the sail section out to be deployed. The one on the right shows where the motors are stored before and after the sail sections 30 (FIG. 6A) are folded and stored in the sail section rack (FIG. 6C). Let's go back to the beginning of the deployment, keeping one thing in mind. When I describe what is happening on one of the lower rail arms, please remember that it is happening on the upper as well (unless I say different).

Figure 2:
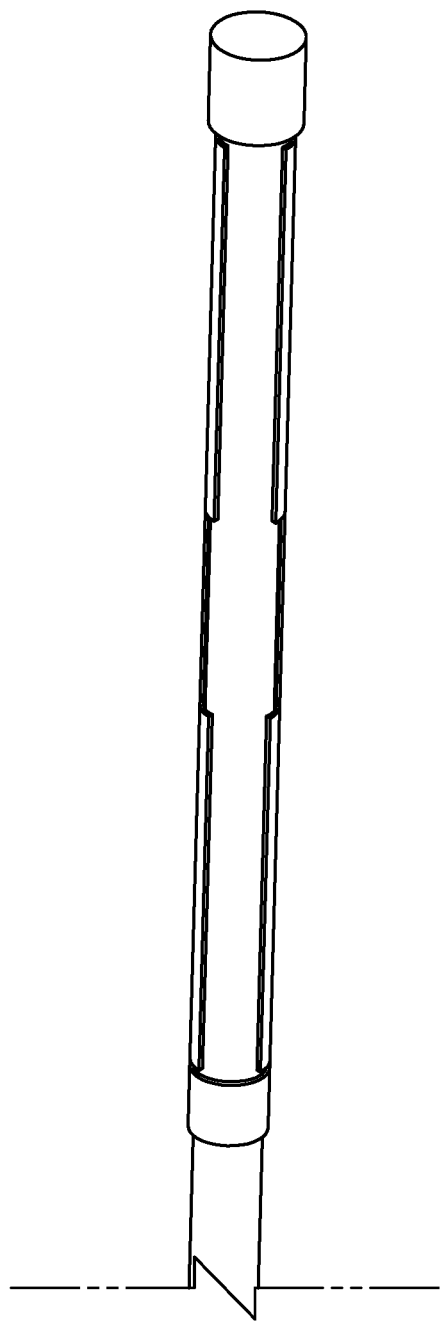
FIG. 2 shows the first stage of the new embodiment in the closed position. In the closed position it protects itself from damaging winds.

Let's start again at FIG. 2. The turbine is completely retracted. At this time the local generator is used to open, deploy, and initiate all necessary operations to make the turbine fully deployed. The procedure or sequence of events will all be automated. In the beginning of the new embodiment's development, each action in the procedure will physically switch on the next action. Later the entire procedure will become automated. Each part of the sequence will be in a computer program which continuously checks its status before moving to the next procedure.

Let's go back to where we left off. The rail arms 12 and 14 (FIG. 3) have been extended out from the rail arm mast 32 (FIG. 6) and the rail arm supports 26 (FIG. 4) have moved out to the ends of the rail arms. After rail arm number one 80 (FIG. 5) has been aligned with the wind, the motors 44 (FIG. 9B) on the right side of the diagram travel down the track and couple (connect) with the first and the last guide and motor pins 46 (FIG. 8). At this point in the procedure all 6 guide and motor pins 46 (FIG. 8) extrude from the bottom of the sail section. The first and last guide and motor pins 46 (FIG. 8) connect to motors. The motors pull the sail sections 30 (FIG. 6A) out onto the rail arms. The other guide and motor pins 46 (FIG. 8) help keep the sail sections on track by staying in the guide pin slot 104 (FIG. 6E) down the middle of the surface of the rail arms.

After rail arm number one 80 (FIG. 5) has been filled you have one completed sail array 28 (FIG. 5). Next the wind capturing apparatus (FIG. 1D) is spun around by the local generator to line up rail arm number two 82 (FIG. 5A) with the wind. Look at FIG. 5A and you can see that rail arm number one 80 (FIG. 5A) has rotated forward. You can also see how the sail sections are open and let the wind blow through. Each of these sail sections are pivoting on the leading motors that are connected to the leading edge 38 (FIG. 8) of the sail sections 30 (FIG. 6A). The bottom edge 42 (FIG. 9A) of the sail sections are not folded because the top and bottom edges of the sails sections are held together by what I call the grouping panels 62 (FIG. 6B). Grouping panels 62 (FIG. 6B) are the length of the bottom and top of the sail sections. They are placed on both sides of the bottom edge 62 (FIG. 9C) and the same thing happens at the top edge of the sails sections and they help to keep the sails sections flat. Now we repeat the deployment procedure for rail arm number three 84 (FIG. 5B). After this is done (FIG. 5B) you can see that rail arm number one 80 and rail arm number two 82 are open to the wind and have rotated further around the tower.

All sail sections 30 (FIG. 6A) are now independently aligned with the wind, and now the wind capturing apparatus (FIG. 1D) must be turned once more. After it turns the next time it will begin to capture the wind on its own. To see how this is possible please go to FIG. 8. You can see that the stopper 54 (FIG. 8) has been raised and will block (restrain) the movements of the sail section. If you go to FIG. 6D, it will show you a different view of how this happens. There are three stoppers 54 (FIG. 6D) shown in this drawing. Please look at how the leading edge 38 (FIG. 6D) is where the sail section pivots over the lower rail arm 14 (FIG. 3). I think you can see what is about to happen (observing the wind direction). The other end of each of the sail sections 30 (FIG. 6A) will be blown against the stoppers 54 (FIG. 6D). When this happens all the sail sections will be aligned and will make one big sail array 28 (FIG. 5). This is when the sail array 28 (FIG. 5) will look like the sails in FIG. 5 and also capture the wind. So, after all the sail sections 30 (FIG. 6A) have been deployed, the stoppers will all be raised when the rail arms approach being upwind from the tower. On the next turn of the wind capturing apparatus (FIG. 1D), the sails sections 30 (FIG. 6A) will be pushed against the stoppers and form the sail array 28 (FIG. 5) wall. After that point, the wind will begin to turn the wind capturing apparatus (FIG. 1D) and produce electricity on its own To retract the turbine it will simply work in reverse. However, to stop the turbine from turning you will have to retract all of the stoppers 54 (FIG. 6D) to let the wind flow freely through the wind capturing apparatus. Then you will have to align the first rail arms (upwind) that you are going to retract with the wind again in order for them to be positioned over the rail arm where the grouping panel can be withdrawn. Then the sail sections 30 (FIG. 6A) can be refolded and stored.

Alternative Embodiment #1

This embodiment is the smaller more personal sized turbine. Like its bigger version, it will produce several times the electricity than its 3 bladed predecessors. But there will be some major differences. The rail arms will be in a fixed position (always open) because wind damage will not be as big of a factor. The entire unit may weigh less than 200 pounds. If wind damaged, the entire machine may be taken down and repaired in a day. The industrial sized version could have a wind capturing apparatus that weighs 70 tons and cause damage in the millions of dollars. The smaller alternative may not need opposing electro-magnets. Permanent magnets may be enough to maintain its frictionless namesake. No complicated sail section will be necessary. These units will be mounted on a pole and raised into the air.

Alternative Embodiment #2

This embodiment captures ocean currents instead of wind. It can be as big as or bigger than the industrial sized wind turbine version. The challenge of assembling such a large structure underwater will be the greatest concern and cost of this job. However, the oceans give an advantage that will be hard to overlook. The speed of ocean currents can be increased by building huge vertical patricians that can funnel the currents into what would be called the ocean current capturing apparatus. It would work like this. Once you have your turbine constructed on a suitable area on the ocean floor, you build two huge walls on both sides of the turbine. The opening between the walls near the turbine would be about the same width as the turbine, but the opening widens as you go away from the turbine. It would help if the walls are as tall as the turbine and it would help even more if the giant funnel was built with a top on it to keep the current from flowing upward over the turbine. This could work because the direction of some ocean currents don't change (unlike the wind changing).

The main structural difference between this one and the wind turbine would be that you would have to construct all the major parts of the turbine to be made buoyancy neutral. All parts would be made with enough built in air pockets so that the parts could be made and towed out to the construction site and then just enough air could be let out to slowly lower the parts into place or the ballast on the parts could be refilled to assist in making the construction job easier. You may not need opposing electromagnets in the entire upper collar because you could make the ocean current capturing apparatus buoyant enough to hover over the tower. But there may be some opposing electro-magnets needed to be built into the sides of the upper collar 16 (FIG. 3) and lower collar 18 (FIG. 3) and the sides of the tower so that the sides will not rub together.

Construction of the first embodiment might be different from how the typical three bladed turbines are built. This is how I would construct the first embodiment. First, let me give some token dimensions. The tower 24 (FIG. 3) will be 500 feet tall. The rail arms 12, 14 (FIG. 3) will be 150 feet long. The sails array 28 (FIG. 5) will be 425 feet high. By my estimates the tower 24 (FIG. 3) will have to hold at least twice the weight of a regular three bladed turbine. The tower may have to be bigger and it may have to be made of stronger materials. Let's make the tower 25 feet in diameter and let's constructed it of carbon fiber instead of steel or reinforced concrete. Carbon fiber is five times stronger than steel and twice as stiff. It is also lighter than steel. The size of all the parts needed may make it more economical to build the parts on-site. To make building on-site more economical the construction factories will have to be temporary and reusable.

Let's build our wind turbine embodiment. First we must build the foundation. After that we must have a Crane on hand. The Crane I have in mind is the Liebert 11200-9.1. It is a telescopic crane that can lift 1179 tons 550 feet into the air. The tower 24 (FIG. 3) can be built in five 100 foot sections and put in place by the Crane. Smaller pieces would have to be made if each piece was over 1100 tons. After the tower is in place and the necessary parts and pieces and tools are placed inside ahead of time, the parts of the wind capturing apparatus (FIG. 1D) will be lifted and put into place. The lower collar 18 (FIG. 6) may have to be put in place after the first segment of tower. That is a simplified version of what would happen.

The material most likely to be used for the sails sections 30 (FIG. 6A) is called ETFE. Its brand name is Tefzel. It is very lightweight and very strong. It is also transparent. This would help the new turbines not be so much of an eyesore. The lower rail arms 14 (FIG. 3) could be lowered by a cable inside or outside the tower. The upper rail arms 12 (FIG. 3) could be raised with hydraulic pistons built into the sides of the upper rail arms 12 (FIG. 3). Just in case you have not imagined the upper rail arm 12 (FIG. 3) as I have intended you to, quickly take a look at FIGS. 9B and 9C. Now imagine them upside down. That would be a good depiction of the upper rail arms 12 (FIG. 3).

Advantages:

From the description above, a number of advantages of some embodiments of my Collapsible Frictionless Vertical Axis Power Generating Wind/Ocean Current Turbine become evident.

(a) A turbine that captures more wind or ocean current should be able to create more electricity compared to how much more wind or ocean current can be captured by a 3 bladed turbine.

(b) A turbine that can create multiple times the energy gives you the option to use less land to build turbines or use the same amount of land to multiply the amount of electricity created locally.

(c) Being able to use this same technology in the oceans could completely free up farm land usage.

(d) Smaller versions of this turbine could make off grid living more of a reality than ever before.

(e) The frictionless aspect of all embodiments of this turbine could improve efficiencies over the old style turbines by generating power at lower wind speeds.

(f) The frictionless aspect of all embodiments of this turbine could reduce maintenance and repair cost due to the lack of physical interaction of the machines parts.

(g) The ocean current embodiment version has the advantage of being in the exactly right location to turn sea water into hydrogen and oxygen by electrolysis of the sea water. The hydrogen can be used to run hydrogen powered automobiles. The hydrogen can also be used in inland power plants instead of coal or natural gas when inland solar and wind turbines are not being used. What happens when the wind stops blowing? If this turbine creates 4 times the power, it could take the other ¾ of its power to make hydrogen through the electrolysis of water and burn hydrogen instead of coal or natural gas to make electricity.

CONCLUSION, RAMIFICATIONS, AND SCOPE

Thus the reader will see that all of the embodiments of the Collapsible Frictionless Vertical Axis Power Generating Wind/Ocean Current Turbine can multiply the amount of power that can be generated compared to the three bladed turbine. With the continuous and constant advancements of newer, stronger, and lighter materials, I am most hopeful about the more personal sized embodiments of the turbine. I can see the smaller versions being almost totally frictionless except for the interaction with the generator head alone. But with the invention of magnetic bearings and a redevelopment of the generator head all friction may soon be eliminated from this technology. This would make repairs due to wear and tear very rare. The large wind activated embodiment of this turbine will be the most challenging as far as construction. The wind capturing apparatus could weigh over 100 tons. Building towers to hold the apparatus 400 or 500 feet in the air may force the possibility of having to build towers with bigger foundations and two walls instead of one. This may have to be done even if the entire wind capturing apparatus (FIG. 1D) is made primarily of carbon fiber. If the rail arms are 150 feet long and the sail sections 30 (FIG. 6A) hang 425 feet to the lower rail arms, this machine might power 2000 homes instead of 500 homes. It becomes obvious why you might want a collapsible turbine that can protect itself from the wind. When it has to hold 100 tons of wind capturing apparatus, you definitely don't want it falling down. Because of the size of it alone, it may be necessary to build most of it onsite. The construction site cost for each of these might be prohibitive. The building site would have to be temporary and reusable to reduce cost.

The undersea embodiment of this turbine has the most potential, in my opinion. You would only need one construction facility at a nearby port that could build dozens of turbines. As stated before, all the parts could be built at neutral buoyancy and towed out to the offshore construction site. Making the seafloor ready to receive the prefabricated parts would probably be the most difficult undertaking for this embodiment of the turbine. The costliest ramification for at least one of the embodiments would be the research and development needed to make the first prototypes.

I claim:

1. A wind/ocean current capturing turbine, comprising:

lower and upper sets of attached support members, comprising upper and lower rail arms, for the purpose of holding multiple wind/ocean current capturing components comprising sail sections that are individually rotatable on the upper and lower rail arms;

concealment of the multiple wind/ocean current capturing components, with the sail sections, to protect the turbine from catastrophic wind/ocean current events;

the multiple wind/ocean current capturing components, with the sail sections that deploy from capturing substantially zero square feet of air/ocean current to capturing a maximum square footage of air/ocean current by combining a group of smaller sail sections, that are folded and concealed against a rail arm mast during the capturing of substantially zero square feet of air/ocean current and that unfold and deploy for capturing of maximum square footage of air/ocean current, into bigger main sail arrays;

wherein the multiple wind/ocean current capturing components are operative to be released from wind/ocean current capturing mode, via stoppers, that allow spinning of the sail sections and stopping of the sail sections when necessary; and wherein the multiple wind/ocean current capturing components are retractable into a protective position in case of catastrophic wind or ocean current events.

2. The wind/ocean current capturing turbine of claim 1, where the catastrophic wind/ocean events include at least one of tornadoes, windstorms, and hurricanes.

* * * * *